(12) United States Patent
Sadrossadat et al.

(10) Patent No.: US 12,019,781 B2
(45) Date of Patent: Jun. 25, 2024

(54) METHOD AND SYSTEM FOR CONFIDENTIAL STRING-MATCHING AND DEEP PACKET INSPECTION

(71) Applicant: LORICA CYBERSECURITY INC., Toronto (CA)

(72) Inventors: Yousef Sadrossadat, North York (CA); Shariq Khalil Ahmed, Mississauga (CA); Yeqi Shi, Toronto (CA); Mohammad Nasirifar, Toronto (CA); Alhassan Khedr, Toronto (CA); Glenn Gulak, Etobicoke (CA)

( * ) Notice: Subject to any disclaimer, the term of this patent is extended or adjusted under 35 U.S.C. 154(b) by 0 days.

(21) Appl. No.: 18/153,676

(22) Filed: Jan. 12, 2023

(65) Prior Publication Data

US 2023/0229801 A1 Jul. 20, 2023

Related U.S. Application Data

(63) Continuation-in-part of application No. 17/932,629, filed as application No. PCT/CA2021/050542 on Apr. 20, 2021.

(60) Provisional application No. 63/013,758, filed on Apr. 22, 2020.

(51) Int. Cl.
G06F 21/62 (2013.01)
G06F 16/903 (2019.01)
G06F 21/60 (2013.01)

(52) U.S. Cl.
CPC .... G06F 21/6227 (2013.01); G06F 16/90344 (2019.01); G06F 21/602 (2013.01)

(58) Field of Classification Search
CPC .......... G06F 21/6227; G06F 16/90344; G06F 21/602
See application file for complete search history.

(56) References Cited

U.S. PATENT DOCUMENTS

| | | | |
|---|---|---|---|
| 9,893,880 | B2 | 2/2018 | Rohloff et al. |
| 10,181,049 | B1 | 1/2019 | El Defrawy et al. |
| 10,608,811 | B2 | 3/2020 | Chen et al. |
| 10,778,408 | B1 | 9/2020 | Khedr et al. |

(Continued)

OTHER PUBLICATIONS

Chen, Hao, et al., "Labeled PSI from Fully Homomorphic Encryption with Malicious Security", (2018). 1223-1237. 10.1145/3243734. 3243836.

(Continued)

*Primary Examiner* — Shewaye Gelagay
*Assistant Examiner* — Carlton Johnson
(74) *Attorney, Agent, or Firm* — Bhole IP Law; Anil Bhole; Marc Lampert

(57) ABSTRACT

Provided is a system and method for hybrid windowing for string-matching of input patterns to a corpus. The method including: establishing a first window size and a hash function; performing hashing on input patterns having a size within a given range using dynamic-sized windows to determine a dynamic-windowed hash set, the given range established using the first window size; performing hashing on input patterns having a size outside the given range using fixed-sized windows to determine a fixed-windowed hash set; combining the dynamic-windowed hash set and the fixed-windowed hash set to determine a combined hash set; and outputting the combined hash set for use in the confidential string-matching.

20 Claims, 18 Drawing Sheets

(56) References Cited

U.S. PATENT DOCUMENTS

| | | | |
|---|---|---|---|
| 11,251,965 B2* | 2/2022 | Minematsu | H04L 9/3247 |
| 2008/0294090 A1 | 11/2008 | Heath | |
| 2011/0185077 A1* | 7/2011 | Bremler-Barr | H03M 7/3086 |
| | | | 709/231 |
| 2014/0075183 A1 | 3/2014 | Wang et al. | |
| 2014/0143889 A1* | 5/2014 | Ginter | G06Q 20/24 |
| | | | 726/27 |
| 2015/0288665 A1 | 10/2015 | El Emam et al. | |
| 2016/0139697 A1* | 5/2016 | Lee | G06F 3/0488 |
| | | | 345/173 |
| 2018/0198601 A1 | 7/2018 | Laine et al. | |
| 2019/0236273 A1 | 8/2019 | Saxe et al. | |
| 2019/0342270 A1 | 11/2019 | Aine et al. | |
| 2020/0151356 A1 | 5/2020 | Rohloff et al. | |
| 2020/0296048 A1 | 9/2020 | Geoffrion et al. | |
| 2021/0112082 A1 | 4/2021 | Carlson et al. | |

OTHER PUBLICATIONS

Karp, Richard M., et al., "Efficient randomized pattern-matching algorithms", IBM Journal of Research and Development, 31(2):249-260, 1987.

Rabin, Michael O., "Fingerprinting by Random Polynomials", Center for Research in Computing Technology: Center for Research in Computing Technology. Center for Research in Computing Techn., Aiken Computation Laboratory, Univ., 1981.

International Search Report for PCT application No. PCT/CA2021/050542, CIPO, search completed: Jun. 14, 2021, dated Jul. 19, 2021.

Written Opinion of the International Searching Authority for PCT application No. PCT/CA2021/050542, CIPO, opinion completed: Jun. 15, 2021, dated Jul. 19, 2021.

Essex, Aleksander, "Secure Approximate String Matching for Privacy-Preserving Record Linkage", IEEE Transactions on Information Forensics and Security, vol. 14, No. 10, pp. 2623-2632, Oct. 31, 2019 (Oct. 31, 2019).

\* cited by examiner

METHOD AND SYSTEM FOR CONFIDENTIAL STRING-MATCHING AND DEEP PACKET INSPECTION

TECHNICAL FIELD

The following relates generally to data processing, and more specifically, to a method and system for confidential string-matching and deep packet inspection.

BACKGROUND

String-matching is a common data processing problem of searching for a pattern of characters within a body of text. The general string-matching approaches do not generally apply any security or privacy features. Confidential string-matching is a variation of the problem where the pattern and the result must remain confidential in an execution environment. In confidential string-matching, the character pattern is encrypted and sent over to a host who performs the confidential string-matching on a body of text. The result of such matching remains confidential, and in many cases, the host does not learn whether there was a match or not. Only the party which has the private key can decrypt and see the match results. This is a significantly harder technical challenge than the general string-matching problem.

SUMMARY

In an aspect there is provided a method for hybrid windowing for string-matching of input patterns to a corpus, the method executed on at least one processing unit, the method comprising: establishing a first window size and a hash function; performing hashing on input patterns having a size within a given range using dynamic-sized windows to determine a dynamic-windowed hash set, the given range established using the first window size; performing hashing on input patterns having a size outside the given range using fixed-sized windows to determine a fixed-windowed hash set; combining the dynamic-windowed hash set and the fixed-windowed hash set to determine a combined hash set; and outputting the combined hash set for use in the confidential string-matching.

In a particular case of the method, the method further comprising establishing a second window size, and wherein the given range comprises patterns having a size between the second window size and the first window size.

In another case of the method, the given range comprises patterns having a size less than the first window size.

In yet another case of the method, the dynamic-sized windows have a plurality of different sizes for respective pattern sizes.

In yet another case of the method, the size of each dynamic-sized window is equal to the size of the input pattern.

In yet another case of the method, the combined hash set comprises the union of the dynamic-windowed hash set and the fixed-windowed hash set.

In yet another case of the method, the method further comprising establishing a size for the fixed-sized windows.

In yet another case of the method, the first window size is established using a predetermined window size value, the hash function is established using a predetermined function, or both.

In yet another case of the method, the first window size, the hash function, or both, are established by agreement communicated between parties to the string-matching.

In yet another case of the method, a match for the confidential string-matching is determined by applying fixed-size windowing on a subset of input patterns where the pattern size is outside of the given range, and by applying dynamic-size windowing on a subset of input patterns where the pattern size is within the given range.

In another aspect, there is provided a system for hybrid windowing for string-matching of input patterns to a corpus, the system comprises at least one processing unit and a data storage media in communication with the at least one processing unit, the at least one processing unit configured to execute a first windowing module, or a second windowing module, to: establish a first window size and a hash function; perform hashing on input patterns having a size within a given range using dynamic-sized windows to determine a dynamic-windowed hash set, the given range established using the first window size; perform hashing on input patterns having a size outside the given range using fixed-sized windows to determine a fixed-windowed hash set; combine the dynamic-windowed hash set and the fixed-windowed hash set to determine a combined hash set; and output the combined hash set for use in the confidential string-matching.

In a particular case of the system, the first windowing module, or the second windowing module, further establishes a second window size, and wherein the given range comprises patterns having a size between the second window size and the first window size.

In another case of the system, the given range comprises patterns having a size less than the first window size.

In yet another case of the system, the dynamic-sized windows have a plurality of different sizes for respective pattern sizes.

In yet another case of the system, the size of each dynamic-sized window is equal to the size of the input pattern.

In yet another case of the system, the combined hash set comprises the union of the dynamic-windowed hash set and the fixed-windowed hash set.

In yet another case of the system, the first windowing module, or the second windowing module, further establishes a size for the fixed-sized windows.

In yet another case of the system, the first window size is established using a predetermined window size value, the hash function is established using a predetermined function, or both.

In yet another case of the system, the first window size, the hash function, or both, are established by agreement communicated between parties to the string-matching.

In yet another case of the system, a match for the confidential string-matching is determined by applying fixed-size windowing on a subset of input patterns where the pattern size is outside of the given range, and by applying dynamic-size windowing on a subset of input patterns where the pattern size is within the given range.

These and other embodiments are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
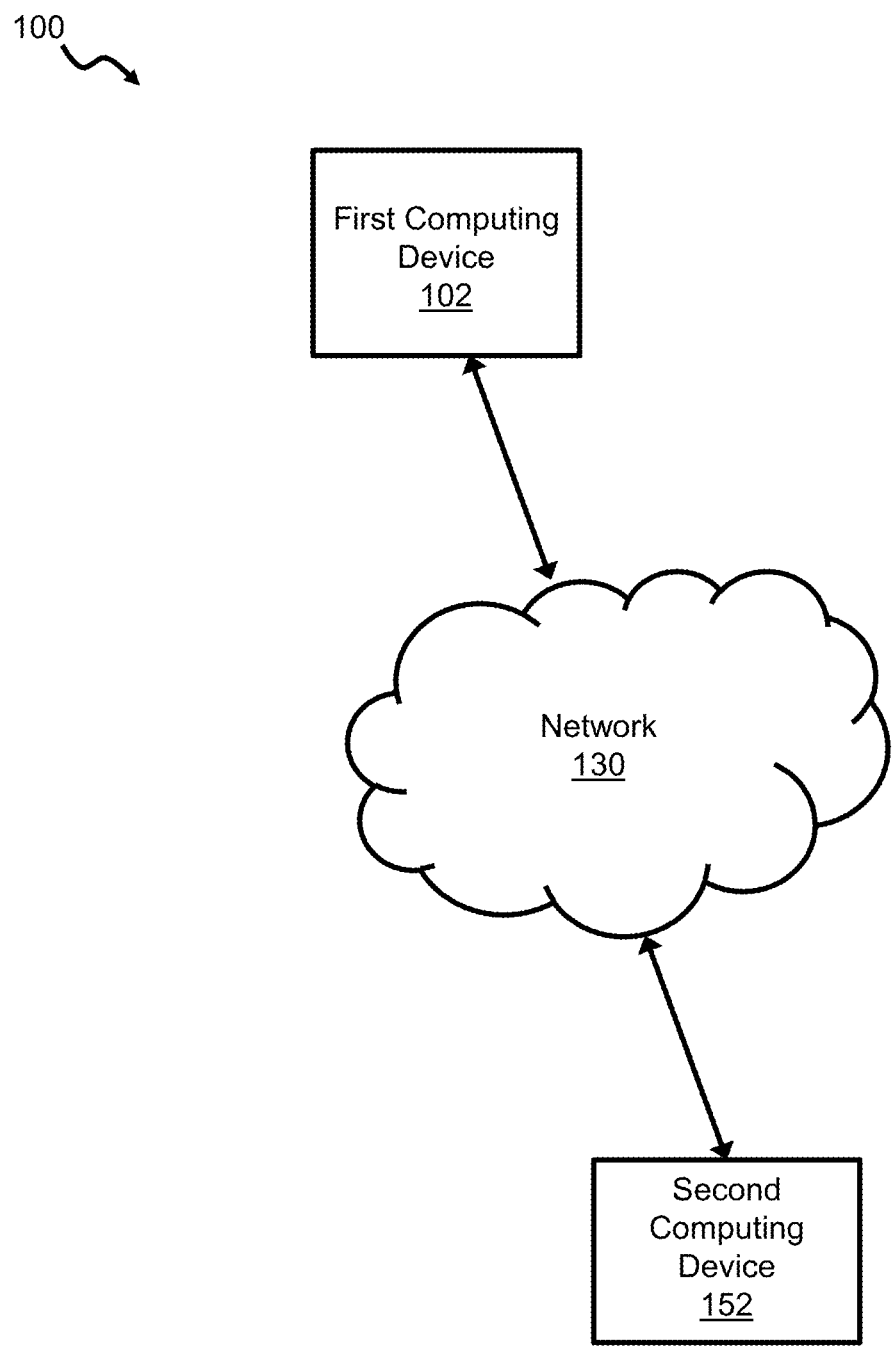
FIG. 1 is a schematic diagram of a system for confidential string-matching, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to non-transitory computer readable media such as storage media, computer storage media, or data storage devices (removable and/or non-removable) such as, for example, magnetic disks, optical disks, or tape. Computer storage media is non-transitory and may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor, as a plurality of processors, as a multi-core and/or multi-threaded processors, or the like. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to data processing, and more specifically, to a method and system for confidential string-matching and deep packet inspection.

The string-matching problem of searching for instances of a pattern within a body of text is a problem with multiple deterministic and approximate approaches for both the single-pattern and multiple-pattern variants of the problem. In an example, the string matching operation is an important operation in the field of bioinformatics.

A naive approach consists of performing a character-wise string comparison between an input pattern and every possible pattern-sized substring in the body of text by creating a window with a size equal to the pattern size and sliding this window over the text one character at a time. In a variation of this approach, a fingerprint for the pattern can be generated and for each of the possible pattern-sized substrings in the body. A fingerprint is an identifier that attempts to uniquely identify a string but is smaller in size than the string itself. The pattern fingerprint is compared to all other fingerprints and a character-wise comparison is performed only if the fingerprints match. The efficiency of this approach depends on two ideas:

1) The fingerprint comparison being faster than character-wise string comparison; and
2) The fingerprinting approach producing highly unique fingerprints to reduce character-wise string comparisons between strings that do not match.

Generalized versions of the fingerprinting approach allow for multiple-pattern searches by fingerprinting fixed-size substrings for all patterns and text.

A particular approach to single-pattern matching exploits the idea that while sliding the pattern on the text, instead of sliding the pattern window by one character like in the naive solution, multi-character slides can be made based on knowledge from comparing just the tail character from the text in the window with characters in the pattern. This allows for sub-linear performance with respect to the text length.

A particular approach to multiple-pattern searches involves the use of a finite-state machine that allows for simultaneous matching of all patterns; thus, reducing the performance impact stemming from searching for multiple patterns. The state machine is constructed using characters from all patterns with links representing the order of characters in the patterns. Supplementary links can be used for fast transition between failed string matches during traversing.

A substantial problem with the above approaches is that progression during execution is reliant upon knowing the partial results of comparisons between pattern data and text data. Therefore, the above approaches cannot be trivially transformed into a form where the data of the pattern or the result remains confidential during execution; thus, failing to satisfy general constraints of confidential string-matching.

A Private Set Intersection (PSI) problem is a problem where two parties, the Receiver and the Sender, each own a private set of text and the Receiver only learns an intersection between the two sets while the Sender learns nothing.

One approach to the PSI problem involves the use of Oblivious Pseudo Random Functions (OPRF), where the Sender holds the key for OPRF. In this approach, the Receiver applies OPRF, by performing the OPRF protocol with Sender, on its set Y to form a new set Y'. The Sender applies OPRF to its own set X locally and sends the new set X' to the Receiver. The Receiver can now find the intersection of the new sets X' and Y', therefore learning the intersection of the set X and Y. The Sender learns nothing. Due to requiring sending of the sets, this approach is inefficient communication-wise; especially when the sets are unbalanced in size.

Another approach to the PSI problem involves using Homomorphic Encryption (HE) to solve an unbalanced PSI problem more efficiently. It transforms the element comparisons into arithmetic circuits that can be evaluated with HE operations. It also has optimizations for efficient mapping and comparison of the sets in HE-compatible structures.

While the above approaches to the PSI problem effectively allow for searching contents of a confidential set in another set, while keeping the result confidential, these approaches accept as inputs databases with well defined fields. Thus, these approaches cannot be applied directly to perform string-matching where one searches for one or more occurrences of a string in a larger string. Moreover, the multiple-pattern variant of string-matching complicates these approaches even further.

For deep packet inspection (DPI), network intrusion systems are deployed as middleboxes on networks that inspect the traffic and enforce a set of rules based on the pattern data in the traffic. These rules consist of a set of actions to perform based on whether a set of signatures exist in the network traffic. Encrypted Network Traffic Searching is the problem of executing searches for signatures on network traffic that utilize communication protocols that encrypt the traffic content for privacy and security.

Some approaches for DPI involve middleboxes that function by decrypting the encrypted traffic before performing the search for signatures. Other approaches utilize purpose-built encryption schemes to allow for searching while keeping the traffic and the signatures confidential. Some other approaches even allow for the actions within the rules to remain confidential until the middlebox needs to perform them. The issue with these approaches is that, while they provide an effective form of matching signatures that are encrypted, they require the network traffic to be encrypted as well. More importantly, instead of keeping the results of the search confidential, they expose the results in order to compute or perform actions from the respective rule; hence, failing the requirements for confidential string-matching.

In the following disclosure, the following notation will be referred to:

For string-matching specifically: P is a pattern set known by the Receiver; s is a text corpus known by the Sender.

For DPI specifically: Z is a signature set known by an Agency (Receiver in a Secure Environment); D is a packet set known by the Host (Sender in an Insecure Environment) containing ordered pairs of (a, b) where a is a packet body and b is a corresponding packet 5-tuple.

$\gamma$ is a minimum possible length for s and for items in P, Z, $D_a$.

$\omega$ is a size of a rolling hash window to apply to s and items in P, Z, $D_a$ where $\omega \leq \gamma$.

X is the Sender/Host's set of fingerprints while Y is the Receiver/Agency's set. It is assumed that $N_X \gg N_Y$.

$\sigma$ is a bit length of items in X and Y.

l represents a label of an element in X.

n is a ring dimension in HE (a power of 2).

q is a ciphertext modulus.

t is a plaintext modulus.

$\mathbb{F}_t$ is a field for a plaintext polynomial.

$\kappa$ denotes a computational security parameter.

$\lambda$ denotes a statistical security parameter.

m is a number of bins in a hash table.

$\alpha$ is a number of partitions that a Host/Sender set X is split into.

$\psi$ is a maximum number of elements in a bin of a hash table, after $\alpha$-splitting.

A particular approach to string-matching is called the Rabin-Karp algorithm, which takes advantage of fingerprinting to reduce the amount of character-level comparisons involved in a naive string-matching approach. For a pattern string p and a text string s, a determination of a fingerprint for p and the fingerprints for each p-sized substring in s are made. The fingerprint of p is compared to each fingerprint from s, only comparing characters between the strings when their respective fingerprints match. This approach generally performs better than the naive approach because of the selection of a fingerprinting algorithm that can provide, for example, the following properties:

1) Virtual Uniqueness: The probability of generating the same fingerprint for two different strings should ideally be negligible. The higher this probability of collision is, the more character-level comparisons need to be performed due to the possibility of false positives.
2) Efficient Computation: The fingerprint calculation and comparison for string of size m should be considerably more efficient than the character-by-character comparison of two strings of size m (not represented as fingerprints).

3) Computation Reuse: The calculation of the fingerprint for substring $\varsigma^i{}_L$ in s should be significantly accelerated if provided with the fingerprint for substring $\varsigma^i{}_{i-1}$ in s. The Rabin-Karp algorithm is generally efficient for multi-pattern string matching.

Generally, fingerprinting algorithms, such as hash functions, only satisfy properties 1 and 2 with some cryptographic variants failing to even satisfy property 2. In contrast, a rolling hash, such as the Rabin fingerprint, is generally able to satisfy all three properties adequately. The Rabin fingerprint treats the input string as a polynomial of bits (a polynomial over Galois field $\mathbb{F}_2$) and generates the hash by dividing the input by a pre-selected irreducible polynomial (over $\mathbb{F}_2$). The ability to update the Rabin fingerprint using only the entry and exit bytes allows it to satisfy property 3. This leads to higher efficiency for large pattern lengths since the complexity of the fingerprints for the large patterns is effectively the same as complexity for the short pattern fingerprint calculations; i.e., the complexity of the fingerprint determination is constant with respect to pattern length.

Additionally, character-level string comparison may also be excluded if the fingerprinting algorithm satisfies virtual uniqueness and the level of false positives received is tolerable for an intended application. The exclusion of character-level string comparison also allows for a parallel implementation in hardware as the algorithm never needs to revisit the data in s if it is being streamed in.

For single-pattern string-matching, the Rabin-Karp algorithm is usually slower than other algorithms, such as Knuth-Morris-Pratt (KMP), as these algorithms gain more information about s for every mismatch and adapt accordingly. Rabin-Karp also suffers from having a worst case behaviour equivalent to the naive approach if the fingerprinting algorithm has high collision probability. However, for multi-pattern string-matching, the Rabin-Karp algorithm may be more appropriate because it compares fingerprints for many patterns. It may additionally compress the pattern fingerprints into a Bloom Filter for constant-time approximate fingerprint comparison at the cost of higher false-positive probability. To adapt for differing lengths of patterns, fingerprints of substrings in s need to be generated for each pattern length. Alternatively, a more generalized version of the algorithm can be used which makes use of rolling windows. In this version, fingerprints of window-sized substrings of s and each $p \in P$, are generated and compared (where P is the pattern set and s is the text string). The window size is selected to be smaller than or equal to size of the shortest p.

Labelled private set intersection (PSI) is a protocol that allows two parties, Sender and Receiver, to perform private set intersection on their respective sets. The Receiver is assumed to hold a set (in an example, a list of customer names). The Sender is assumed to hold another set, where each element in the set is associated with a label. This label can represent any construct, in this example, ranging from a data field associated with each customer name to a handle for objects (such as documents, images, or the like). The Labelled PSI protocol returns to the Receiver, the intersection of the Sender's and Receiver's set, and the corresponding labels of the intersection. This protocol leverages HE, such that the computation and communication will generally reveal no information about the result to the Sender.

To perform a particular implementation of the Labelled PSI protocol, generally without optimizations, the intersection of two sets is performed by evaluating a "Match Function":

$$F(x)=(x-y_1)*(x-y_2)* \ldots *(x-y_{N_Y})$$

where x is an element in the Receiver's Set, and $y_1, y_2, \ldots, y_{N_Y}$ are all elements in the Sender's set. It can be seen that when x exists in the Sender's set, F(x) will output zero, otherwise it is an arbitrary value.

The corresponding labels for the intersection are obtained by evaluating a "Label Function":

$$G(x)=\{l \text{ if } x \text{ exists in set; arbitrary\_value otherwise}\}$$

G(x) is created by interpolating a polynomial on all pairs of $(y_i, l_i)$, where $y_i$ is an element in the Sender's set and $l_i$ is its associated label. So when x exists in the Sender's set, G(x) will output the corresponding label; otherwise it will output an arbitrary value.

The encrypted results of F(x) and G(x) are sent back to the Receiver for decryption. When F(x) is zero, the element exists in the set, and that G(x) is the correct label associated with that element; otherwise the value in G(x) is an arbitrary value. The above procedure is repeated for each element in the Receiver's set to find the entire intersection and associated labels. The above procedure can be directly mapped to HE by encoding an element x into a ciphertext, and mathematical operations in F(x) and G(x) are performed using corresponding HE mathematical operations.

The above implementation uses the Labelled PSI protocol, however, it is can generally be inefficient when datasets become relatively large. In some cases, the Labelled PSI procedure can use a variety of techniques to reduce the communication and computation costs, including binning, batching, windowing, and splitting.

For batching, each query element is encoded in a single ciphertext. However, depending on the choice of HE security parameters, each ciphertext can hold many coefficients based on the degree of the polynomial encoded. The mathematical operations on the HE ciphertext are performed coefficient-wise, therefore the evaluation of Match Function and Label Function can be applied to all coefficients of a ciphertext simultaneously. Batching the query elements reduces the communication cost and memory footprint significantly.

Figure 4:
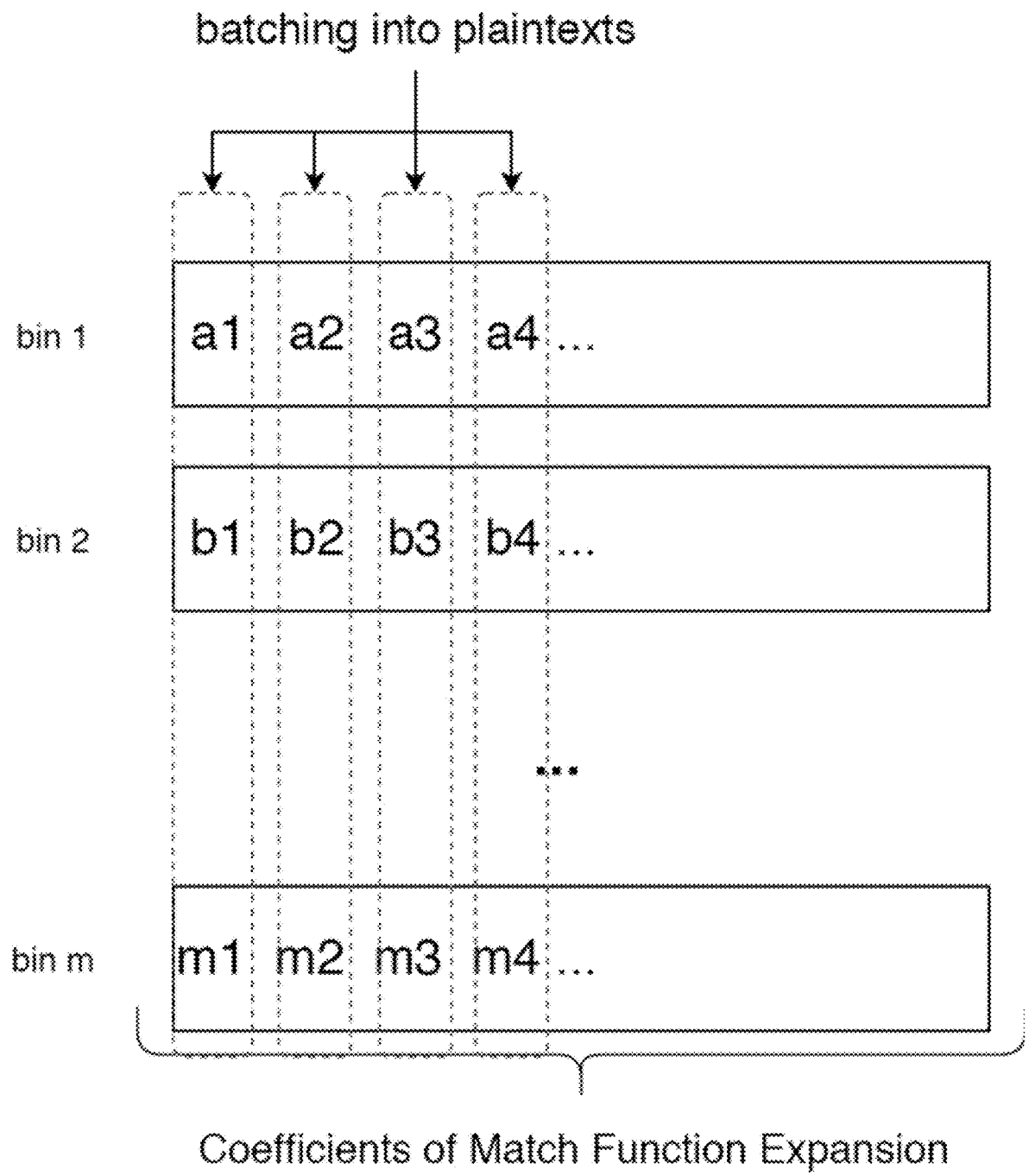
FIG. 4 is a diagrammatic example of binning and batching in labelled PSI protocol.

Binning is a technique to reduce the search space for a query in Labelled PSI. In a basic case, each Match Function and Label Function evaluation is effectively searching an element in the entire Sender's set. To reduce the search space, the Sender and Receiver agree upon a set of hash functions, then the Sender places its elements into a set of bins by hashing each element. Similarly, the Receiver will use the same set of hash functions to perform hashing on its set to form its own set of bins. In some cases, cuckoo-hashing can be used instead of regular hashing to distribute across the hash table more densely so that the space in the query ciphertext can be used more effectively. The effect of binning is that an element in the Receiver's bin can only exist in the corresponding Sender's bin, so a search need only be conducted in corresponding bins instead of the entire set. Binning can be combined with batching to perform multiple Match and Label evaluations with a single query ciphertext as long as the Receiver's database elements are placed into different bins (with no collisions), as illustrated in the example of FIG. 4.

Figure 5:
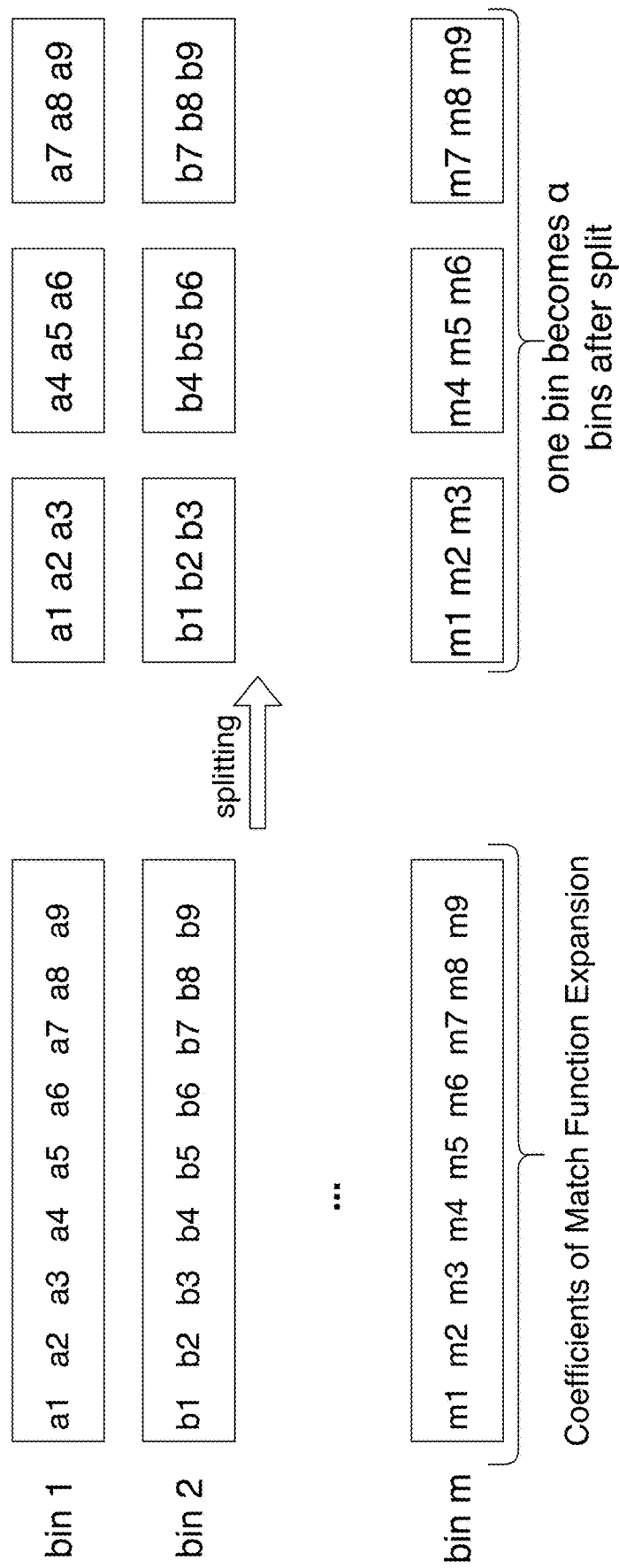
FIG. 5 is a diagrammatic example of splitting in labelled PSI protocol.

The Splitting technique is used to break up each bin into $\alpha$ smaller bins, and a query is performed on each of the smaller bins. The results are collected from the different sub-bins, as illustrated in the example of FIG. 5. The effect of splitting is three-fold:

Query on each smaller bin is independent from one another, thus can be parallelized.

Splitting helps reducing the bin load of each bin, which can result in a smaller-sized interpolation to create G(x).

Smaller bin load leads to less noise growth when evaluating F(x) and G(x).

However, the splitting technique will generally increase the number of result ciphertexts by the same factor α.

The match function F(x) can be expanded as follows:

$$F(x)=(x-y_1)*(x-y_2)* \ldots *(x-y_\psi)=a_1+a_2x+a_3x^2+ \ldots +a_{\psi+1}x^\psi$$

The $a_1, a_2, a_3, \ldots, a_{\psi+1}$ are coefficients of the powers of x after the expansion, which depend only on individual bins from the Sender's set. This minimizes the number of consecutive multiplications required in ciphertext given that some or all the powers of x (i.e. x, $x^2$, $x^3$, ..., $x^\psi$) can be pre-computed in plaintext and encrypted individually at the Receiver before sending to the Sender.

The Receiver sends the query ciphertext x to the Sender. To avoid the Sender needing to exponentiate the query ciphertext, the Receiver computes the powers of the query in plaintext and encrypts them before sending it to the Sender. However, sending all powers of x can become prohibitively large for communication. The Receiver can choose to send windows of x instead, e.g. x, $x^2$, $x^4$, $x^8$, .... The Sender can then compute the missing powers.

In most cases, HE operations, such as addition and multiplication, incur noise growth on the ciphertexts. Excessive noise growth can result in decryption failure. The splitting and binning operations can be used to decrease the degree of F(x) and G(x) polynomial functions.

In some cases, some parts of the protocol can be pre-computed to speed up subsequent processing, for example online processing. Among these parts are:

Coefficients of Match Function after expansion F(x): $a_1, a_2, a_3, \ldots, a_{\psi+1}$ Coefficient of Interpolation Polynomial G(x): $k_1, k_2, k_3, \ldots, k_{\psi+1}$ Powers of query ciphertext x: x, $x^2$, $x^3$, ..., $x^\psi$ In some cases, with the splitting operation, each F(x) and G(x) evaluation can be performed on each sub-bin separately. As a result, a high-level optimization can be performed by running F(x) and G(x) evaluations for each sub-bin in parallel. As evidenced by exemplary experiments conducted by the present inventors, implementations of the parallelization can dramatically decrease execution time.

In the present embodiments, any suitable homomorphic encryption (HE) can be used; for example, Fully Homomorphic Encryption (FHE), Somewhat Homomorphic Encryption (SHE), Levelled Homomorphic Encryption (LHE), Partial Homomorphic Encryption (PHE), and the like.

Advantageously, embodiments of the present disclosure provide confidential string-matching protocol using HE; such as integrating the Rabin-Karp algorithm and Labelled PSI protocol to form the confidential string-matching protocol. Additionally, embodiments of the present disclosure provide confidential deep packet inspection using HE by applying multiple optimization techniques such that the confidential string-matching protocol can be used in deep packet inspection over network traffic. Additionally, embodiments of the present disclosure provide a hybrid windowing scheme that can significantly improve effectiveness of searches for the confidential string-matching protocol. Additionally, embodiments of the present disclosure provide compression techniques to reduce the size of the encrypted results, which results in a reduced communication overhead. Additionally, embodiments of the present disclosure provide multiple parallelization and pipelining optimizations to enable use in practical applications.

In embodiments of the present disclosure, the Rabin Karp algorithm and the Labelled PSI are integrated by fingerprinting the substrings of the patterns and the text corpus, encoding the location of each fingerprint in the text corpus as a label, and performing Labelled PSI on the two fingerprint sets to obtain the matched fingerprints and their locations in the original text string. These results can be post-processed to know which pattern matched where in the text. This integration advantageously enables confidential string-matching using HE.

The string-matching protocol of embodiments described herein can be utilized in inspecting network packets in an insecure environment. Embodiments of the present disclosure also provide optimization techniques to provide an approach that can be run over high speed networks without leaking, (1) the set of signatures being searched for and (2) whether there was a match or not.

In some embodiments of string-matching, hybrid windowing can be used. Such hybrid windowing can include using multiple window sizes, instead of fixed window sizes, in order to substantially improve accuracy. In some cases, the hybrid windowing approach can use multiple sliding windows to ensure uniqueness for longer strings.

Example experiments were conducted to verifying the advantages of the hybrid windowing approach. Firstly, the Rabin-Karp sliding window technique, with a fixed-size window, was performed and a Boolean recall percentage was determined to be as low as approximately 50%. In a similar example experiment, using the hybrid windowing approach, the Boolean recall ratios were determined to be as high as 95%. In both example experiments, the Boolean recall was calculated as:

$$\text{Boolean recall} = \frac{TP}{TP+FN}$$

where TP and FN refer to number of true-positive and false-negative examples, respectively.

The Labelled PSI protocol can contain an α-splitting optimization to reduce the search space; however, generally at a cost of α times larger result size. As the results are all encrypted, the amount of ciphertexts the protocol generates may become prohibitive in a practical setting. Embodiments of the present disclosure provide a technique to compress the number of result ciphertexts to achieve higher efficiency in real applications.

Embodiments of the present disclosure exploit the fact that the a pairs of ciphertext results from the splitting approach generally contain the same information as the single pair of ciphertext results obtained without splitting. Therefore, they are compressible from an information theory perspective. This fact can be used to construct an arithmetic circuit that operates on the original result ciphertexts to reduce the results to a constant number of ciphertexts with respect to the length of text string being searched.

Embodiments of the present disclosure leverage parallelization, multi-threading, GPU computing, and pipelining techniques to enable practical, high-performance confidential string-matching. These techniques can be used to accelerate and schedule multiple sections of the approach, for example, without the loss of generality, polynomial interpolation, and HE operations.

Referring now to FIG. 1, a system 100 for confidential string-matching, in accordance with an embodiment, is shown. In this embodiment, the system 100 includes a first computing device 102 (in the confidential string matching embodiment, referred to as a Receiver) and a second computing device 152 (in the confidential string matching embodiment, referred to as a Sender) communicating over a network 130 (for example, a local area network or the Internet). The computing devices can be any suitable device; for example, a desktop computer, a laptop computer, a smartphone, a tablet computer, a mobile device, a smartwatch, or the like. In further embodiments, aspects or functions of the system can be run on further computing devices, such as a separate server. In some embodiments, the components of the Receiver computing device 102 and the Sender computing device 152 are each stored by and executed on a single computer system. In other embodiments, the components of the Receiver computing device 102 and the Sender computing device 152 are each distributed among two or more computer systems that may be locally or remotely distributed.

Figure 2:
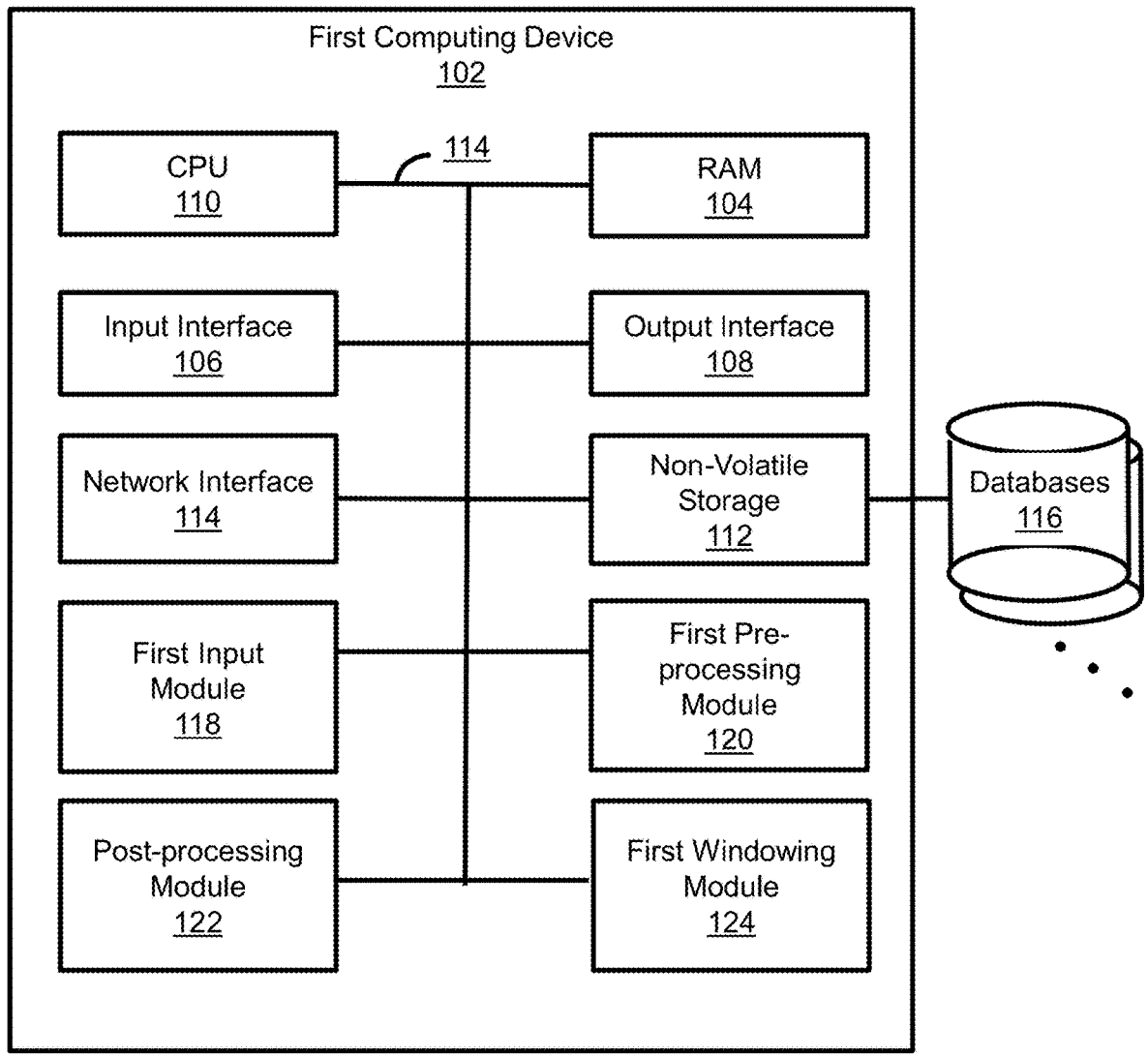
FIG. 2 is a schematic diagram showing an example embodiment of a first computing device of the system of FIG. 1.

FIG. 2 shows an example embodiment of the first computing device 102 including various physical and logical components. As shown, the first computing device 102 has a number of physical and logical components, including a central processing unit ("CPU") 110 (comprising one or more processors), random access memory ("RAM") 104, an input interface 106, an output interface 108, a network interface 114, non-volatile storage 112, and a local bus 114 enabling CPU 110 to communicate with the other components. CPU 110 executes an operating system, and various modules, as described below in greater detail. RAM 104 provides relatively responsive volatile storage to CPU 110. The input interface 106 enables an administrator or user to provide input via an input device, for example a keyboard and mouse. The output interface 108 outputs information to output devices, such as a display and/or speakers. The network interface 114 permits communication with other systems, such as the Sender 152 over the network 130, or other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data, as described below, can be stored in database(s) 116. During operation of the system 100, the operating system, the modules, and the related data may be retrieved from the non-volatile storage 112 and placed in RAM 104 to facilitate execution. In an embodiment, the first computing device 102 further includes a number of conceptual modules, including a first input module 118, a first pre-processing module 120, a post-processing module 122, and a first windowing module 124. In some cases, the modules 118, 120, 122, and 124 can be executed on the CPU 110. In further cases, some of the functions of the modules 118, 120, 122, and 124 can be executed on a server, on cloud computing resources, or other devices. In some cases, some or all of the functions of any of the modules 118, 120, 122, and 124 can be run on other modules.

Figure 3:
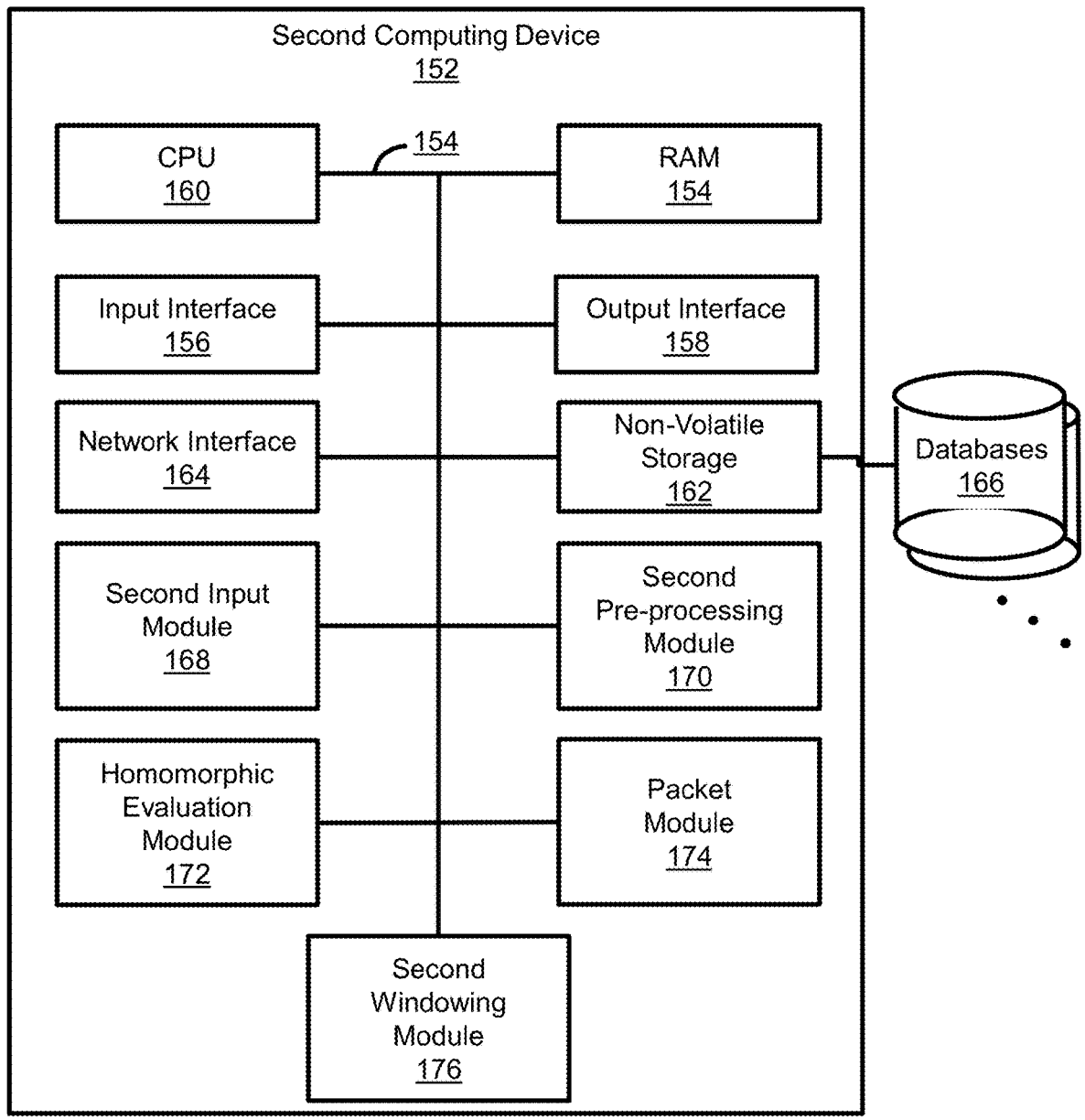
FIG. 3 is a schematic diagram showing an example embodiment of a second computing device of the system of FIG. 1.

FIG. 3 shows an example embodiment of the second computing device 152 including various physical and logical components. As shown, similar to the first computing device 102, the second computing device 152 has a number of physical and logical components, including a central processing unit ("CPU") 160 (comprising one or more processors), random access memory ("RAM") 154, an input interface 156, an output interface 158, a network interface 154, non-volatile storage 162, and a local bus 164 enabling CPU 160 to communicate with the other components. CPU 160 executes an operating system, and various modules, as described below in greater detail. RAM 154 provides relatively responsive volatile storage to CPU 160. The input interface 156 enables an administrator or user to provide input via an input device, for example a keyboard and mouse. The output interface 158 outputs information to output devices, such as a display and/or speakers. The network interface 164 permits communication with other systems, such as the second computing device 152 over the network 130, or other computing devices and servers remotely located from the system 100, such as for a typical cloud-based access model. Non-volatile storage 162 stores the operating system and programs, including computer-executable instructions for implementing the operating system and modules, as well as any data used by these services. Additional stored data, as described below, can be stored in database(s) 166. During operation of the system 100, the operating system, the modules, and the related data may be retrieved from the non-volatile storage 162 and placed in RAM 154 to facilitate execution. In an embodiment, the Receiver 102 further includes a number of conceptual modules, including a second input module 168, a second pre-processing module 170, a homomorphic evaluation module 172, a packet module 174, and a second windowing module 176. In some cases, the modules 168, 170, 172, 174, and 176 can be executed on the CPU 160. In further cases, some of the functions of the modules 168, 170, 172, 174, and 176 can be executed on a server, on cloud computing resources, or other devices. In some cases, some or all of the functions of any of the modules 168, 170, 172, 174, and 176 can be run on other modules.

In further cases, the CPU 110, 160 can be a combination of multi-core CPU and GPU to achieve high performance. Alternatively, the CPU 110, 160 can be implemented on custom ASICs and/or FPGAs, effectively realizing an Application Specific Processor (ASP).

In further cases, the network 130 data stream can be statistically de-multiplexed into multiple streams and fed to identical hardware units. This can lead to higher processing capacity and therefore ability to handle higher input bandwidth.

The system 100 is able to perform confidential string-matching as a variation of the string-matching problem in which a character pattern is encrypted and sent over to a Sender that performs the confidential string-matching on a body of text. It is a general requirement that the result of such matching must remain confidential, and the Sender cannot learn whether there was a match or not. Only the party which has the private key can decrypt and see the match results. In some examples, confidential string-matching is particularly useful in the following scenarios:

A Digital Safety Deposit Box: confidential string-matching can be used by a digital container that can store sensitive documents (e.g., Passports, Security Certificates, Land Deeds, etc.) in an encrypted or unencrypted format, such that the owner can perform a search with encrypted queries on the contents of the documents (or indexes or metadata) without revealing the queries or the results.

Confidential web search: confidential string-matching can be used by a web search engine that can perform searches on website indexes without the website host being aware of the query string or the results, protecting the privacy of the user.

Confidential access to a database: confidential string-matching can be used to permit access to a database that is public, while hiding the query and result.

Confidential access to an encrypted database: confidential string-matching can be used to securely access an encrypted database. whereas an example, the United States Security and Exchange Commission (SEC) authority may wish to do secure insider trading audits on metadata associated with encrypted commodity trading data.

IP theft detection: confidential string-matching can be used by an agency to perform a search for unpublished or protected Intellectual Property they own to check for leaks or infringements without revealing information to the search execution space.

Confidential Search Engine: confidential string-matching can be used to perform encrypted queries on encrypted or plaintext data and the result remains encrypted and can only be decrypted by the owner of the private key.

Confidential R&D or Legal Document Search: confidential string-matching can be used to securely search patent metadata and abstracts protecting the privacy of company R&D teams and legal teams for the purpose of not revealing the specific technical subject matter of interest or under development by the company.

Confidential Geolocation Quarantine Compliance: In an epidemic, confidential string-matching can be used by a user who is to be quarantined at home. Where their cell phone GPS coordinates can be encrypted and used as a pattern in confidential string matching to verify against their home, doctor's office, hospital, or pharmacist geolocations to securely verify that they are fulfilling their quarantine obligations.

Contact Tracing: Confidential string matching can be used to find the intersection of GPS coordinates (or equivalent location specifier). This can be useful for finding people and/or objects (e.g., autos, trucks, shipping containers, and the like) that were in close proximity to a person and/or location of interest (e.g., warehouse, military installation, first responder address location).

For string-matching to be secure and confidential, the confidentiality of the patterns and the match results generally need to remain secure and confidential during runtime. In order to achieve this requirement, Homomorphic Encryption (HE) can be utilized. To perform mathematical operations on encrypted HE ciphertext without decrypting and without compromising encryption, the confidential string-matching algorithm can be represented using arithmetic circuits.

In some cases, due to limitations of some of the arithmetic operations performed on the HE ciphertext, certain aspects may not be properly represented with HE arithmetic circuits, and in such cases, such aspects can be represented and performed in plaintext; i.e., plain text operations are limited to operations on non-confidential terms and operations in pre-encryption/post-decryption state of confidential terms. Additionally, there may be limits to the depth of the HE arithmetic circuits due to underlying noise growth from the HE operations. This means that substantially deep arithmetic circuits may become impossible, even if the computing budget to evaluate them is available. Mapping the naive string-matching approach into an arithmetic circuit generally requires representation of character comparisons and a conjunction of those comparisons to each other.

For a confidential pattern p and non-confidential (or confidential) text s, an expression that can be used for mapping the naive string-matching approach into an arithmetic circuit is:

$$f(p)=(p_1-s_i)*(p_2-s_{(i+1)})*(p_3-s_{(i+2)})* \ldots *(p_{N_p}-s_{(i+N_p)})$$

where $p_i$ and $s_i$ represents the $i^{th}$ character in a string p and s, respectively. This expression is to be determined for each i, where $1 \leq i \leq N_s-N_p+1$; which means the result size is proportional to the length of s. The length of p is non-confidential. The circuit depth is proportional to the length of p. Without even considering multi-pattern searches, the HE operation performance and ciphertext size of other approaches quickly make the above expression impractical as the length of p or s is increased. Advantageously, embodiments of the present disclosure provide a more efficient approach in order to be used in practical applications.

The matching component of string-matching algorithms, such as Knuth-Morris-Pratt (KMP) and Boyer-Moore (BM), is defined by the representation and traversal of complex structures; such as deterministic finite automatons (DFA). Representation and traversal of these structures as an arithmetic circuit, while ensuring the pattern remains confidential, is difficult and non-trivial. Meanwhile, the matching component of the Rabin-Karp (RK) algorithm, described herein, includes an approach that can be used to integrate with HE. If the fingerprint algorithm in RK can offer negligible collision probability, the character-level search could effectively be discarded. The matching component could then be described as a search for a fingerprint (of p) in a set of fingerprints (from s). Enforcing the requirement of keeping p confidential turns this into the Private Set Intersection (PSI) problem where at least one set is required to be private (in some cases, both sets can get encrypted if needed). For the case of unbalanced PSI, where one set is much smaller than the other, the system 100 can advantageously integrate RK with the Labelled PSI to implement confidential string-matching.

Figure 6:
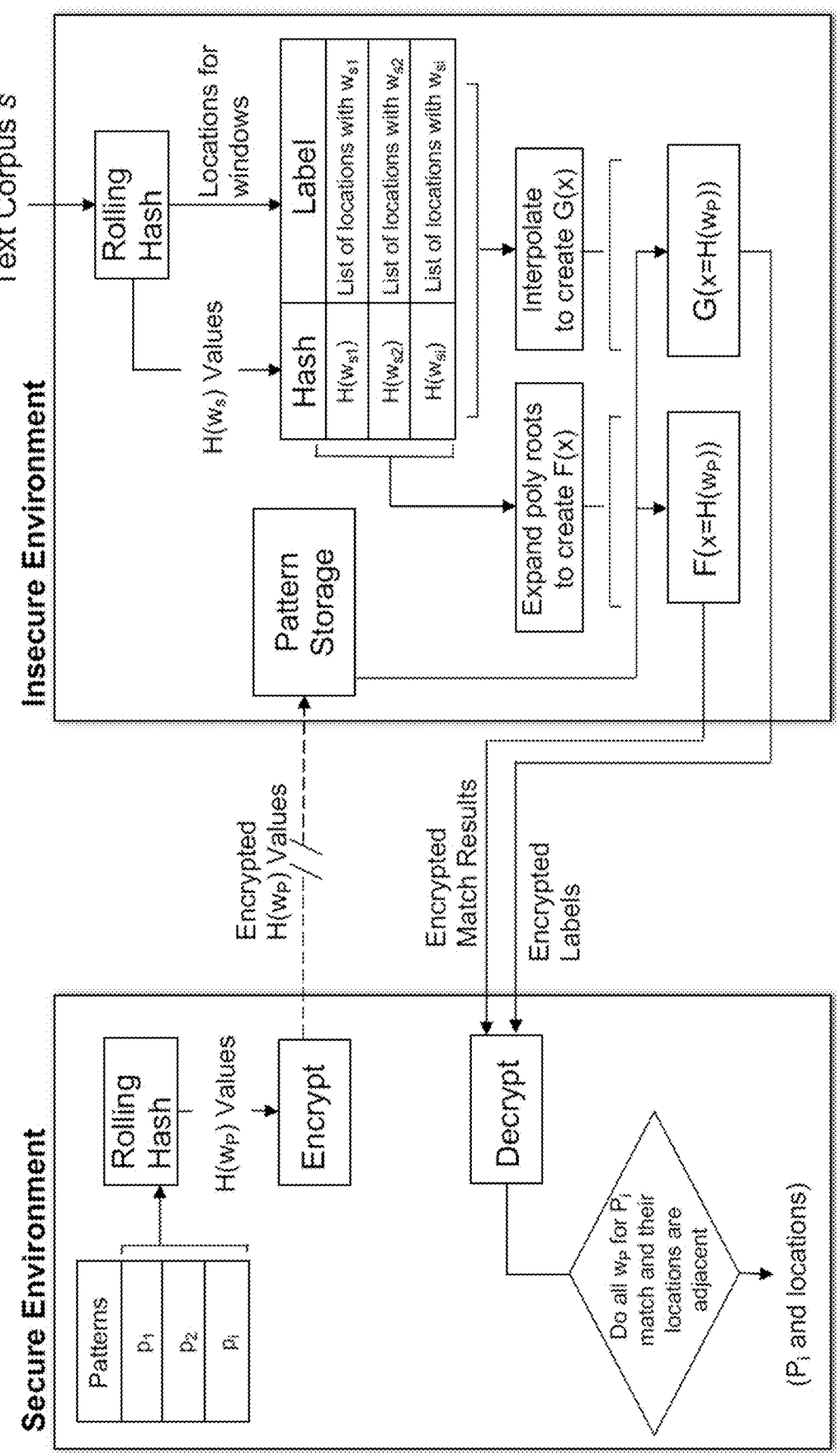
FIG. 6 illustrates a diagram of an example high-level overview of an approach to confidential string-matching by the system of FIG. 1.

FIG. 6 illustrates a diagram of an example high-level overview of an approach to confidential string-matching by the system 100. In this approach, in addition to knowing whether p exists in s, the system 100 can also identify the locations in s where p matched. The label in the labelled PSI algorithm is used to encode the set of these locations as a label. Additionally, since the system 100 addresses the multi-pattern confidential string-matching problem, a generalized version of Rabin-Karp can be used. In a particular case, this involves rolling a fixed-size window over each pattern p in P and generating a fingerprint for each unique window to form the confidential set of fingerprints, Y. The same rolling window process can be applied to the body of text s, to form the non-confidential set of fingerprints X. This process effectively translates to searching for windows from each p instead of searching for p itself. To account for this, in most cases, a post-decryption step can be performed. In this step, if all windows for a p matched, then the locations of these windows are compared to check if the matched windows were consecutively adjacent in s; hence, confirming whether p exists in s. If the locations in s are not a requirement of the problem and some level of false positives are tolerable in the intended application, then the label encoding and offset comparison can be excluded in order to save on computation and communication at the cost of potential false positives.

In some embodiments, using fixed-size windowing, to determine input transformations, for each pattern p∈P, a fixed-size window w is rolled over p, giving (len(p)−len(w)+1) fingerprints for each p (where the function len(a) returns the length of the string a). Each fingerprint can be treated as an element in the Receiver's set Y; and thus forms the Receiver's set Y. Additionally, a fixed-size window w can be rolled over text s, giving (len(s)−len(w)+1) fingerprints. Each fingerprint can be treated as an element in the Sender's set X. At the same time, the label of each element is the set of locations (offsets) of each fingerprint in s. The label may contain multiple locations since a pattern can occur multiple times in the text. This step forms the Sender's set X. The Labelled PSI protocol can be formed for X and Y.

In some embodiments, using dynamic-size windowing, instead of splitting the queries using fixed-size windows and hashing each window, each query signature can be hashed as one entire window. As query signatures usually have different lengths, this will usually result in having a range of different sizes of windows (referred to herein as 'dynamic-sized windows') with each window having a length determined by a respective signature length. A substantial advantage of the dynamic-windowing approach is that each query does not necessarily have to be divided into smaller windows; where highly frequent fixed-size small windows can render some of the signatures unsearchable. This advantage essentially transforms the sub-string matching problem to an exact matching problem. In example experimental implementations, the search generally performed exceptionally well in scenarios where the range of signature lengths were relatively small, for example 10 to 15 characters. These example experiments showed that as the range of signature lengths grow, the database size also grows with a multiplicative factor approximately equal to the signature length range.

In some embodiments, expansion of the processed database can be reduced by using a hybrid of the dynamic-sized and fixed-size windows (referred to herein a 'hybrid windowing'). In the hybrid windowing approach, a factor for selecting either fixed-sized windows or dynamic-sized windows is a size of each signature. For example, where a signature size is between a small window size of $\omega_l$ and large window size of $\omega_h$, the dynamic-sized windowing approach can be used. For the remaining signatures outside this range, the fixed-size windowing approach can be used to roll fixed-size windows of a given number of characters of (e.g., $\omega_h$ characters). In some cases, dynamic-sized windowing can be used for all signatures below the large window size of $\omega_h$. Since a smaller range of dynamic windows is generally used in a hybrid windowing approach, it can reduce the expansion of the size of the database.

Additionally, since the hybrid approach makes it possible to use smaller windows for smaller signatures, compared to the fixed-size windowing approach, the fixed-size windows of $\omega_h$ can be used for more characters; which translates to relatively lower frequency for each window and resulting in relatively higher accuracy. In an example experiment, where a small window size of $\omega_l=4$ characters was used and a large window size of $\omega_h=10$ characters was used, the expansion of the processed database was substantially reduced.

In some cases, using the hybrid windowing approach, to determine input transformations, the Receiver's set Y can be formed. To form the Receiver's set Y, for each pattern p∈P, if the pattern size is less than or equal to $\omega_h$, the pattern is hashed only once using the pattern size. Otherwise, if the pattern size is bigger than $\omega_h$, a fixed-size non-overlapping window $\omega_f$ is rolled over p, giving (len(p)/len(w)) fingerprints for each p. Each fingerprint is then treated as an element in the Receiver's set Y, and thus, the above forms the Receiver's set Y.

The Sender's set X can then be formed by having a set of dynamic-sized windows, with sizes between $\omega_l$ and $\omega_h$, is rolled over text s, giving $\Sigma_{\omega=\omega_l}^{\omega_h}(\text{len}(s)-\text{len}(w)+1)$ fingerprints. Each fingerprint is treated as an element in the Sender's set X. Additionally, the label of each element can be the set of locations (offsets) of each fingerprint in s. The label may contain multiple locations since a pattern can occur multiple times in the text. The above can form the Sender's set X. Thus, the Labelled PSI protocol can be performed using X and Y.

The result from running Labelled PSI gives the matched fingerprints and associated locations in s. Matched patterns and respective locations in s can then be determined. The Receiver can re-roll the window over each of pattern p∈P, and check if all fingerprints from a pattern are matched. If not, then this pattern is not found in text s. If they were all matched, there can be a probabilistic or deterministic implementation. For the probabilistic implementation, the pattern is matched in text with some probability, and the match locations are the locations of the first fingerprint of the pattern. For the deterministic implementation, the locations of these fingerprints are checked to determine if they are consecutively adjacent. If so, then the pattern is found in those locations in the text.

As described herein, one of the optimizations performed for the labelled PSI is to split each of the bins into α smaller bins in order to further reduce the search space per bin; which reduces the degree of the F(x) and G(x) polynomial functions. This optimization is performed at the cost of generating a more F(x) and G(x) polynomial functions and computing a pairs of result ciphertexts instead of a single pair of ciphertexts (one per polynomial) for each query ciphertext. In confidential string-matching, these result ciphertexts are sent back to the Receiver for decryption. In order for the protocol to be practical, the collective size of the results should be smaller than the text corpus s being searched upon. Unfortunately, in order to keep F(x) and G(x) construction practical, the split factor α must scale with the length of s; making the protocol impractical for longer s.

The optimization performed by the system 100 to address the above technical challenge is based on the observation that, advantageously, the α pairs of ciphertext results from the splitting approach contain the same information as the single pair of ciphertext results obtained without splitting. Therefore, it is compressible from an information theory perspective. This stems from the notion that results from both approaches are still solving the same problem. The system 100 takes advantage of the above idea to use an arithmetic circuit that operates on the evaluations of all the F(x) and G(x) (previously known as the result ciphertexts) to reduce the results to a constant number of ciphertext with respect to the length of s.

For match result compression, in the labelled PSI protocol, for a query x, the function F(x) evaluates to a 0 if the respective coefficient in x matched in the Sender's bin or to an arbitrary value if there is no match. This implies that for each query ciphertext, the set of match ciphertext results can be compressed to a single ciphertext by a multiplication of the results:

$$U(x)=F_1(x)*F_2(x)* \ldots *F_\alpha(x)$$

where $F_i(x)$ is the evaluation of a F(x) polynomial for the $i^{th}$ bin in the smaller α set of bins.

For label result compression, in the labelled PSI protocol, for a query x, the function G(x) evaluates to the label of the respective coefficient in x if it matched in the bin (if the respective coefficient in F(x) is 0); else it evaluates to an arbitrary value. Observe that for a search in a single bin, only one of the items in the respective bin can match as items in a bin are unique. When the bin is split into smaller bins, only one of the smaller bins can match. This implies that for each query coefficient, only one of the respective coefficients from all the F(x) for each bin will be 0. This property can be exploited by the system 100 to reduce the label ciphertext results:

$$H(x)=G_1(x)*F^1(x)+G_2(x)*F^2(x)+ \ldots +G_\alpha(x)*F^\alpha(x)$$

where $F^k(x)=\Pi_{i=1,i\neq k}^\alpha F_i(x)$ and $G_i(x)$ is the evaluation of a G(x) polynomial for the $i^{th}$ bin in the smaller α set of bins.

For each query coefficient, the respective coefficient in H(x) will contain an arbitrary value if x did not match in the bin, otherwise it will contain the label for x multiplied by a constant. A separate ciphertext Q(x) is determined, which holds the constant for each query coefficient:

$$Q(x)=F^1(x)+F^2(x)+ \ldots +F^\alpha(x)$$

In most cases, the cyphertext Q(x) should be included to make it possible to extract the label after decryption of search results.

To extract the label, the multiplicative inverse of decrypted Q(x) is multiplied by the decrypted H(x):

$$Label=H(x)G^{-1}(x)$$

Figure 7A:
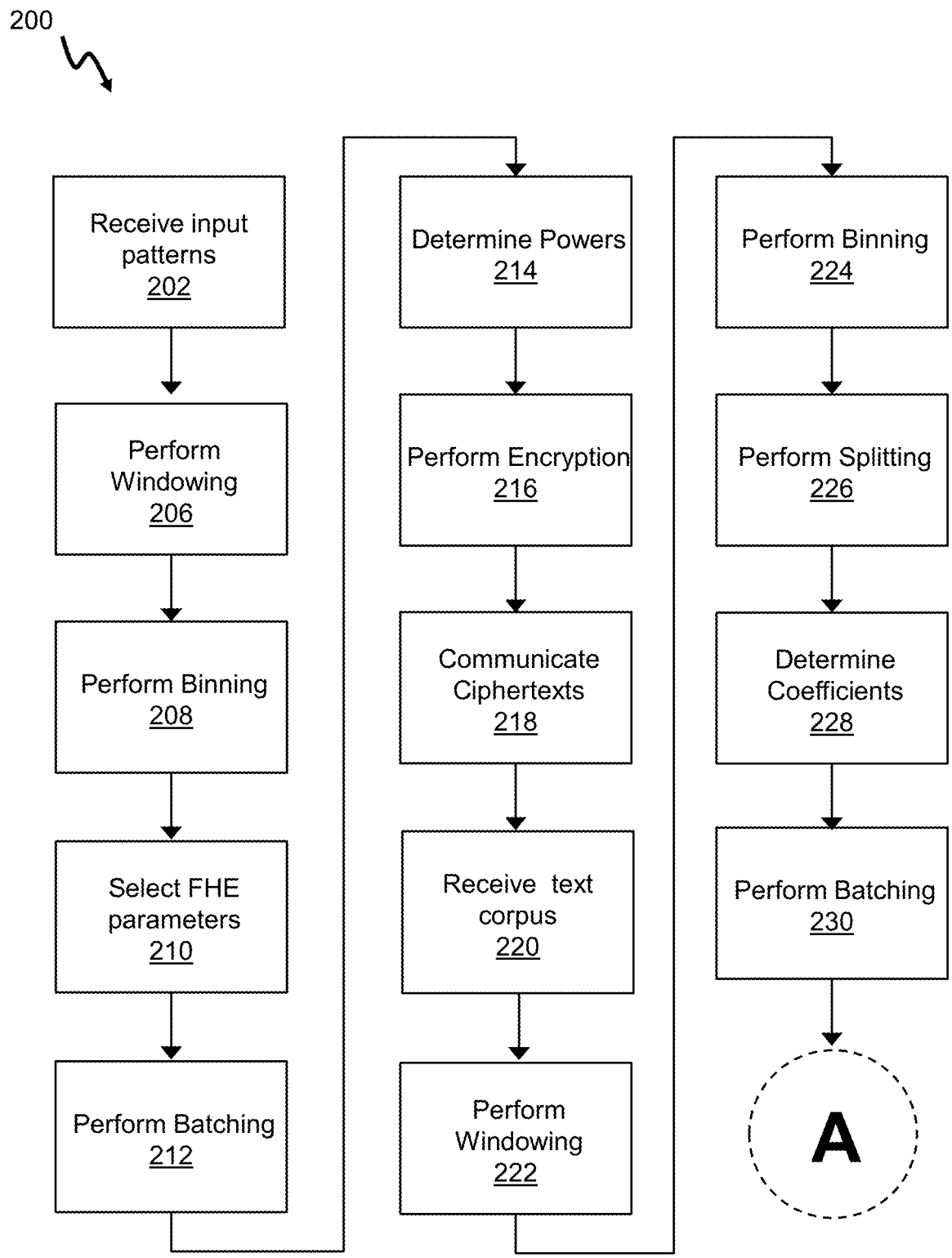
FIGS. 7A and 7B are a flowchart of a method for confidential string-matching, in accordance with an embodiment.
Figure 7B:
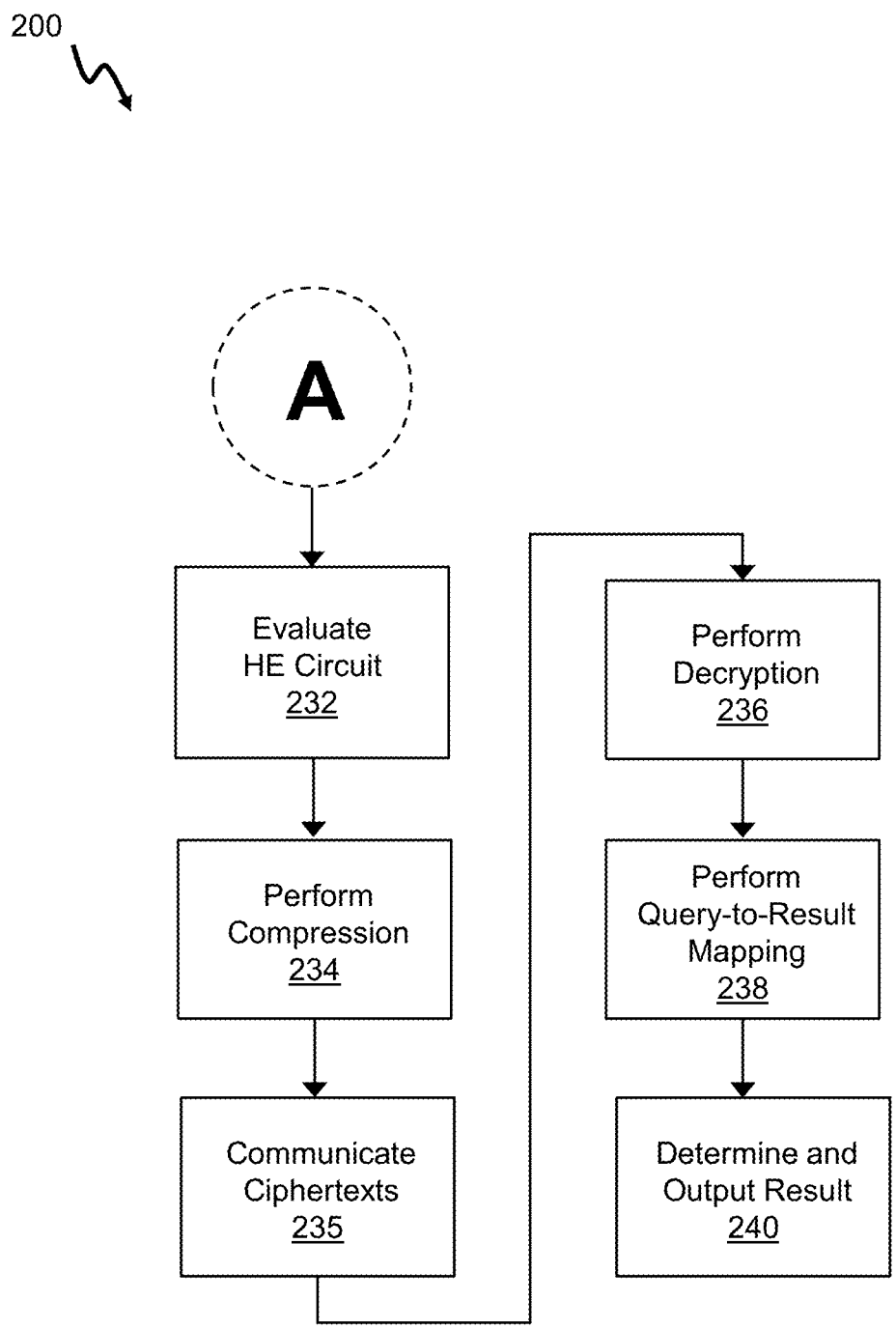

FIGS. 7A and 7B illustrate a flowchart diagram of a method for confidential string-matching 200, in accordance with an embodiment. In some cases, the alphabet Σ can consist of 0 and 1 (Σ={0,1}). In other cases, the alphabet can comprise any suitable set of digits (including negative), characters, and/or symbols as part of the alphabet. It is appreciated that at least some of the order and necessity of the steps and limitations of the method 200 can be varied or changed as appropriate, while retaining the technical contributions of the method 200.

At block 202, the first input module 118 receives an input pattern set $P \subset \Sigma^*$, for example, from the input interface 106, the database 116, or the network interface 114. The input pattern comprises a set of patterns P, where each pattern consists of elements from the alphabet and has minimum length γ.

At blocks 206 to 216, the first pre-processing module 120 performs pre-processing for the Receiver. In some cases, this pre-processing can take place offline, when the first computing device 102 is not necessarily connected to the network 130.

At block 206, the first pre-processing module 120 engages with the first windowing module 124 to perform windowing. In some cases, using the fixed-size windowing approach, the first windowing module 124 performs windowing by, for all p∈P, determining the hash values for each ω-sized window of p, to form set $Y=\{h_1(w_p)|\forall w_p \in p, \forall p \in P\}$. In most cases, the Receiver and the Sender communicate to agree upon, or use a predetermined value for, a first hash function $h_1$ which maps an ω-sized window to a value in the range [0, $2^\omega$) ($h_1:\{0,1\}^\omega \mapsto [2^\omega]$). Thus, for all patterns in pattern set P, the pre-processing module 120 determines the hash values with the first hash function $h_1$ for each ω-sized window of the pattern, to form the set of hashes Y.

In an example using fixed size windowing, the ω parameter can be selected as less than or equal to the shortest pattern string. In such example, for a specific ω, it can be assumed that there is a window that can hold ω characters. The first ω characters are selected, then the window is shifted by one or more characters those ω characters are formed as part of the window. This is repeated until the end of p is reached.

Figure 8:
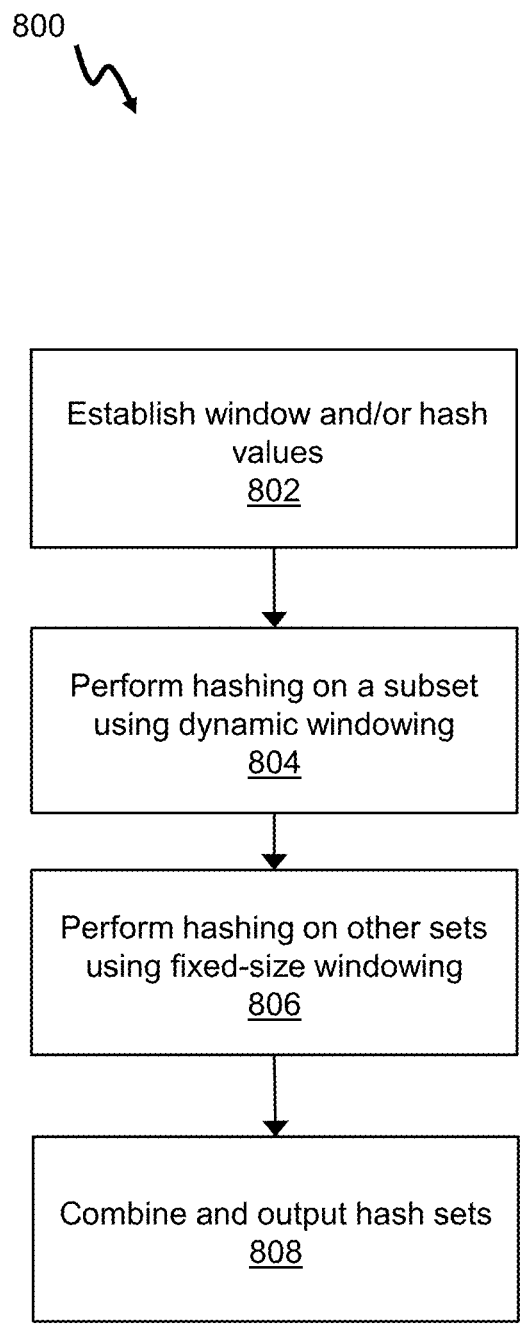
FIG. 8 is a flowchart of a method for hybrid windowing, in accordance with an embodiment.

In some cases, as part of block 206, the first windowing module 124 performs an embodiment of a hybrid windowing method 800, as illustrated in the flowchart of FIG. 8. At block 802, the first windowing module 124 establishes a large window size $\omega_h$ (also referred to as a first window size), a hash function $h_1$, and in some cases, a small window size $\omega_l$ (also referred to as a second window size) and/or a fixed windowing size $\omega_f$ and/or a dynamic windowing size $\omega_d$. In some cases, the small window size $\omega_l$ can be 1. The hash function $h_1$ maps a given input to a value in a given range, for example, [0, $2^\omega$); ($h_1: \{0,1\}^\omega \mapsto [2^\omega]$). In some cases, establishing the above can use predetermined values and/or a predetermined function. In some cases, establishing the above can include having the Receiver and the Sender communicate to agree upon values and/or a function. At block 804, using dynamic windowing, the first windowing module 124 determines hash values, using $h_1$, for each pattern p in order to form dynamic-windowed hash set $Y_d=\{h_1(p)|\forall p \in P, \omega_l \leq \omega_p \leq \omega_h\}$. Dynamic windowing is used for patterns p (for all p∈P) having a size (denoted as $\omega_p$) between a given range (for example, between $\omega_l$ and $\omega_h$). At block 806, using fixed-size windowing, the first windowing module 124 determines hash values for each $\omega_f$-sized window of p (for example, $\omega_f$ can be $\omega_h$) in order to form fixed-windowed hash set $Y_f=\{h_1(w_p)|\forall w_p \in p, p \in P, \omega_h < \omega_p, \omega_w = \omega_f\}$. Fixed-sized windowing is used for patterns p (for all p∈P) having a size outside of the given range (for example, less than $\omega_l$ or greater than $\omega_h$). In some cases, dynamic windowing can be performed with more than one $\omega_d$ size for different ranges of pattern sizes. At block 808, the first windowing module 124 combines hash sets $Y_d$ and $Y_f$ (e.g., $Y=Y_d \cup Y_f$) to determine a combined set of hashes Y, which can then be outputted and used for the other confidential string matching operations.

At block 208, the first pre-processing module 120 performs binning. The parameter m which represents the number of bins, and a second hash function $h_2$ which maps a value in the range [0, $2^\omega$) to a value in the range [1, m], are agreed upon to place all items from Y into a table C with m bins. In most cases, the Receiver and the Sender communicate to agree upon, or use a predetermined value for, the parameter m that represents the number of bins, and the second hash function $h_2: [2^\omega] \mapsto [m]$, to place all the items from Y into the table C with m bins. In further cases, the second hash function $h_2$ maps an ω-sized window to the parameter m that represents the number of bins ($h_2: \{0,1\}^\omega \mapsto [m]$). Such cases can considerably reduce the collision rate and allow for better parameter set selection.

At block 210, the first pre-processing module 120 selects HE parameters. The Receiver and the Sender communicate to agree upon, or use a predetermined value for, parameters (n, q, t) for an indistinguishability under chosen-plaintext attack (IND-CPA) secure HE scheme for the chosen κ and λ. t is selected to be large enough so that each element in Y (represented by σ bits) can be fit into $\log_2 t$ bits so that $\log_2 t > \sigma$.

At block 212, the first pre-processing module 120 performs batching by interpreting the table C as a 2D array of m rows, where each row represents elements from a single bin. In some cases, for each column of the 2D array, the pre-processing module 120 batches the m elements into plaintext polynomials $\bar{Y}_b$. Each plaintext polynomial can be treated as a batch b. While use of the polynomials are not strictly required, they are useful for computational efficiency. In some cases, each ciphertext can encrypt only one element; however, this will be inefficient because the same ciphertext can be used to encrypt a polynomial; the polynomial capable of containing many elements (e.g., tens of thousands of elements).

At block 214, the first pre-processing module 120 determines powers of $\overline{Y}_b$. For each $\overline{Y}_b$, the pre-processing module 120 determines all the powers of $\overline{Y}_b$ from 1 to $\psi$ (represented by a set $\{(\overline{Y}_b)^k | \forall k \in [1, \psi]\}$), where $\psi$ is the maximum power of $\overline{Y}_b$ as agreed upon by the Receiver and the Sender.

At block 216, the first pre-processing module 120 performs encryption. For each $\overline{Y}_b$, the pre-processing module 120 uses, for example, HE.Encrypt to encrypt each power, ($\overline{Y}_b)^k$, to generate ciphertexts: $c_b^k$=HE.Encrypt$((\overline{Y}_b)^k)$. At block 218, the network interface 114 communicates the ciphertexts to the Sender.

At block 220, the second input module 168 receives a text corpus $s \in \Sigma^*$, for example, from the input interface 156, the database 166, or the network interface 164. The text corpus s comprises elements from the alphabet and is of minimum length $\gamma$.

At blocks 222 to 230, the second pre-processing module 170 performs pre-processing for the Sender. In some cases, this pre-processing can take place offline, when the second computing device 152 is not necessarily connected to the network 130.

At block 222, the second pre-processing module 170 engages with the second windowing module 176 to perform windowing. In some cases, as part of block 222, the second windowing module 176 uses the fixed-size windowing approach by determining hash values for each $\omega$-sized window of s, to form set of hashes X using agreed upon the first hash function $h_1$, which maps an $\omega$-sized window to a value in the range $[0, 2^o)$; i.e., set $X=\{h_1(w_s) | \forall w_s \in s\}$ using the agreed upon the first hash function $h:\{0,1\}^w \mapsto [2^o]$.

In some cases, as part of block 222, the second windowing module 176 performs the hybrid windowing method 800 illustrated in the flowchart of FIG. 8. Using the method 800, the second windowing module 176 determines hash values for each $\omega$-sized window of input s, where $\omega$ is between $\omega_l$ and $\omega_h$, to form a set of hashes for X using the first hash function $h_1$, i.e., set $X=\{h_1(w_s) | \forall (\omega_l \leq \omega_w \leq \omega_h \lor \omega_w = \omega_l)\}$.

At block 224, the second pre-processing module 170 performs binning. The parameter m and the second hash function $h_2$ as agreed upon, which maps a value in the range $[0, 2^o)$ to a value in the range $[1, m]$, $h_2: [2^o] \mapsto [m]$, to place all items from X into table T with m bins. In further cases, the second hash function $h_2$ maps an $\omega$-sized window to the parameter m that represents the number of bins ($h_2: \{0,1\}^w \mapsto [m]$). Such cases can considerably reduce the collision rate and allow for better parameter set selection.

At block 226, the second pre-processing module 170 performs splitting. For each bin in T, the second pre-processing module 170 splits it into $\alpha$ sub-bins of size at most $\psi$, denoted as $T[i, 1], \ldots, T[i, \alpha]$; where $T[i,j]$ is the $j^{th}$ sub-bin in the $i^{th}$ bin.

At block 228, the second pre-processing module 170 determines coefficients. For each sub-bin $T[i,j]$, the second pre-processing module 170 matches the polynomial by determining a symmetric polynomial $F_{i,j}$ over $\mathbb{F}_t$ such that $F_{i,j}(x)=0$ only if x exists in $T[i,j]$; i.e., $x \in T[i,j]$. For each sub-bin $T[i,j]$, the second pre-processing module 170 interpolates the polynomial $G_{i,j}$ over $\mathbb{F}_{t,t}$ such that $G_{i,j}(x)=l_x$ only if x exists in $T[i,j]$; i.e., $x \in T[i,j]$. Where $l_x$ is a set of locations $\{o_1, o_2, \ldots o_i\}$ from s where the respective window that hashes to x ($w_x$) exists.

At block 230, the second pre-processing module 170 performs batching. The polynomials $F_{i,j}$ are interpreted as a matrix, where i indexes the row and j indexes the column. The second pre-processing module 170 batches the $k^{th}$ coefficient of each polynomial in a column into one plaintext polynomial $\overline{F}_{j,k}$, which denotes the plaintext polynomial for the $k^{th}$ coefficient in the $j^{th}$ sub-bin. The second pre-processing module 170 performs the same batching on the label polynomials G to form the batched plaintext polynomials $\overline{G}_{j,k}$.

At blocks 232 to 234, the homomorphic evaluation module 172 determines the matching for the Sender homomorphically and compresses the results. At block 232, for the $b^{th}$ batch received from the Receiver, the homomorphic evaluation module 172 homomorphically evaluates the HE circuit. For each sub-bin, the homomorphic evaluation module 172 homomorphically evaluates the function: $f_{b,j} = \overline{F}_{j,1} + \Sigma_{k=1}^{\psi} c_b^k \cdot \overline{F}_{j,k+1}$. The same operation can be repeated for $\overline{G}_{b,j}$ and the label ciphertexts $g_{b,j}$ can be denoted as such.

At block 234, for the $b^{th}$ batch received from the Receiver, the homomorphic evaluation module 172 performs compression. As described herein, the homomorphic evaluation module 172 compresses $f_{b,j}$ and $g_{b,j}$ by evaluating:

$$u_b = \Pi_{j=1}^{\alpha} f_{b,j} \tag{a}$$

$$v_{b,j} = \Pi_{i=1, i \neq j}^{\alpha} f_{b,i} \tag{b}$$

$$q_b = \Sigma_{j=1}^{\alpha} v_{b,j} \tag{c}$$

$$h_b = \Sigma_{j=1}^{\alpha} g_{b,j} \cdot v_{b,j} \tag{d}$$

At block 235, the network interface 164 communicates the match ciphertext $u_b$, and in some cases, the label ciphertext q and the ciphertext $h_b$ to the Receiver. In some cases, $u_b$ and $q_b$ can be determined in a depth-optimal manner by the use of a multiplication tree.

At blocks 236 to 240, the post-processing module 122 determines and outputs a result for the confidential string-matching. In some cases, this post-processing can take place offline, when the first computing device 102 is not necessarily connected to the network 130. At block 236, the post-processing module 122 performs decryption. For the $b^{th}$ batch, the post-processing module 122 uses, for example, HE. Decrypt on the ciphertext $u_b$ to obtain $r_b$, which can be interpreted as a vector of n elements in Ft. As such, it forms the corresponding label vector:

$$l_b = (HE.Decrypt(q_b))^{-1} \cdot HE.Decrypt(h_b)$$

At block 238, the post-processing module 122 performs query-to-results mapping. For each query vector $\overline{Y}_b$, there is a corresponding match vector $r_b$ and label vector $l_b$. The coefficients from each $\overline{Y}_b$ vector collectively form the set Y. A table M is formed that is indexed by a coefficient from $\overline{Y}_b$ and returns a respective coefficient from $r_b$. Thus, the coefficients from each $r_b$ are used to form a table M such that $M[\overline{Y}_b [i]] = r_b [i]$ for all batches, where $i \in [0, n]$. The same approach can be performed to form a table L that is indexed by a coefficient from $\overline{Y}_b$ and returns a respective coefficient from $l_b$. Thus, the coefficients from each $l_b$ can be used to form a table L such that $L[\overline{Y}_b [i]] = l_b[i]$ for all batches.

At block 240, the post-processing module 122 determines the result for the confidential string-matching. For each $p \in P$, the post-processing module 122 determines hash values for each $\omega$-sized window of p with the first hash function $h_1$, similar to block 206. Using the fixed-size windowing approach, an ordered set $H=\{\eta=h_1(w_p)|\forall w_p \in p\}$ is formed. The pattern p, and the corresponding intersection set O (the locations), are outputted if and only if: (1) the windows from p exist in s (i.e., indexing into M with all hashes in H returns 0); and (2) the windows from p are found located in the same order adjacently in s (i.e., if there exists a subset of locations returned from indexing into L with all hashes in H that are consecutively adjacent with respect to each other). These conditions can be denoted as:

$$M[\eta_i] = 0 \; \forall \; \eta_i \in H \text{ and } \bigcap_{i=1}^{N_H} \text{sub}(L[\eta_i], i-1) \neq \phi$$

where $\text{sub}(S, n) = \{s-n|\forall s \in S\}$.

Using the hybrid windowing approach, fixed-size windowing is applied on a subset of patterns where the pattern size is outside of a given range (for example, outside of the range between $\omega_l$ and $\omega_h$) and a match is identified as a result for the confidential string-matching. For each one of the remaining patterns, where the pattern size $\omega p$ is within the given range (for example, between $\omega_l$ and $\omega_h$), the pattern p, and the corresponding intersection set O (the locations), are outputted if and only if: (1) the pattern p exists in text s (i.e., indexing into M with all hashes in H returns 0); and (2) the pattern p is found in the set H.

Thus, for each query polynomial, the post-processing module 122 determines a match polynomial and, in some cases, a label polynomial. Each of the coefficients generally represent an independent query (search for respective fingerprints). If the respective fingerprint matched, then the corresponding coefficient in the match polynomial will be zero; and the corresponding coefficient in the label polynomial will contain a list of locations where such fingerprint was located. In order to link the window-fingerprint search to the overall pattern search, tables M and L are used, which contain the match results and label results, respectively, for all the query polynomials. Then for each pattern, the post-processing module 122 determines the pattern's respective window-fingerprints and checks the results for the window-fingerprints in M and L. If the window-fingerprints are all 0 in M (representing that they all were found), then the post-processing module 122 checks if these windows exist adjacent to each other in s, in the same order they are in the respective pattern, using locations from L for each window in the pattern. Hence, the post-processing module 122 checks if there is any location where the location of the first window equals the location of the second window minus one, which equals the location of the third window minus two, and so on, for all the windows of the respective pattern.

In some embodiments of the confidential string-matching method 200, to ensure no undesirable information is revealed by revealing the size of results, the Sender returns a fixed-size label for each query regardless of whether there was a match or not. Higher label-sizes can increase communication cost to the point that, in some cases, it becomes inefficient. To overcome this issue of inefficiency, a limit, herein also referred to as supported repetitions, can be applied on the number of matched locations for each window. If the number of matched locations is more than the supported repetitions, the result returned by the Sender may only include up to the applied limit. Applying the limit on the number of matched locations can make the method 200 substantially more efficient, for example, in cases where patterns being searched for, $p \in P$, appear infrequently in the text corpus s.

In many cases, communication complexity and computation complexity may be taken into consideration for practical application of the method 200. These complexities can generally depend on one or more of the following factors:

|X| as the number of unique windows in text,
|Y| as the number of unique windows from all patterns,
l as the number of ciphertexts to represent the largest possible label,
m as the number of bins in a hash table,
α as number of partitions that a Host/Sender set X is split into, and $$\psi = \frac{|X|}{m\alpha}$$

as the number of elements in a bin after splitting.

In a further embodiment, the system 100 can be used for a type of confidential string-matching referred to as confidential deep packet inspection (DPI). Generally, DPI is a type of data processing that inspects, in detail, the data being sent over a computer network. In many approaches, DPI consists of searching for signatures in a network data stream and executing rules based on the results. It is beneficial to be able to perform DPI on some network traffic in an insecure environment where the signatures being searched for and the results must remain confidential. Such a system should ideally be able to perform DPI in a practical manner at high network speed. These requirements present a substantial technical challenge and can be referred to as the confidential DPI problem.

Advantageously, the system 100 can be used to substantially address the security and efficiency constraints of the confidential DPI problem; for example, by transforming the string-matching problem described herein into the confidential DPI problem. In the confidential DPI problem, the first computing device 102 (in this embodiment, referred to as an Agency) holds a set of signatures to be kept private, and the second computing device 152 (in this embodiment, referred to as a Host) receives a continuous stream of packets. This stream is segmented according to a fixed time-interval, and DPI is performed on each segment. DPI on each segment is mapped to the confidential string-matching protocol, described herein, to leverage its performance and efficiency (where the Agency is the Receiver and the Host is the Sender). Here the Agency is in a "Secure Environment" and the Host may be in an "Insecure Environment". In practice, this embodiment has been determined to be able to process many signatures (e.g., tens of thousands) against a high-speed network (e.g., Gbps). This embodiment can have many applications, for example:

Critical Infrastructure Monitoring: Governments can monitor the networks of their critical infrastructures (e.g., power, nuclear, wireless communication systems, internet service providers, water supply, financial institutions, and the like) from attacks coming from suspicious or threatening sources (e.g., hackers, dark web, nation state attacks, and the like). Signatures identifying these sources can be encrypted and placed in network nodes inside the critical infrastructure networks for continuous monitoring and intrusion detection.

IP Protection: Confidential DPI can be integrated into network boundary firewalls to be aware of Intellectual Property leaving the protected network (data exfiltration).

Anti-terrorism and Dark Web Surveillance: An agency can perform inspection on a network without revealing sensitive signatures or results to the public.

Money Laundering Monitoring: An agency can perform monitoring on networks suspected of money laundering traffic.

Insider Trading Monitoring: An agency can perform monitoring on private networks suspected of insider trading traffic without exposing the data on the private networks (e.g., a government can mandate DPI on internal networks of technology companies).

Cloud Account Log Files: The SOC of a company that uses the cloud for its corporate operations can securely and privately query events in the log files of their cloud account including whether stored restricted corporate information was accessed by whom, at what time, and in what region.

Figure 9:
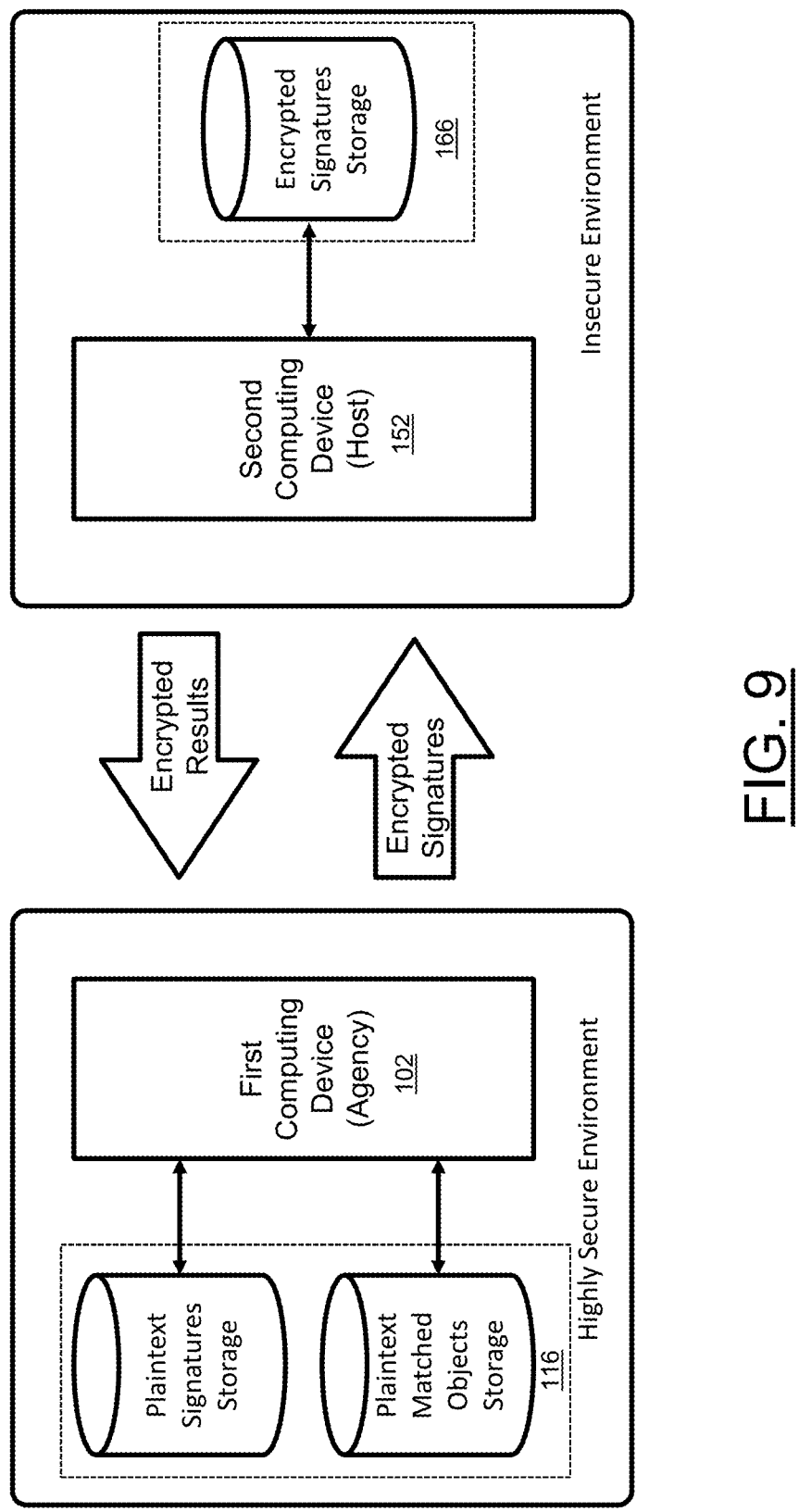
FIG. 9 illustrates a high-level schematic diagram of an example implementation of the system of FIG. 1 used for confidential deep packet inspection (DPI)

FIG. 9 illustrates a high-level schematic diagram of an example implementation of the system of FIG. 1 used for confidential deep packet inspection (DPI). In this example, the first computing device 102 representing the Agency is located within a highly secure environment. As part of the databases 116, a database of plaintext signatures and a database of plaintext matched objects are also within the highly secure environment. In most cases, the first computing device 102 has access to both databases in the same secure environment. The second computing device 152 representing the Agency is located in an insecure environment. As part of the databases 166, an encrypted signatures database is also located in the insecure environment. The second computing device 152 is generally responsible for forming HE queries and encrypting the queries prior to sending the signatures to the first computing device 102. Generally, the signatures are updated infrequently, and as such, the second computing device 152 can store the encrypted signatures in a persistent storage. The second computing device 152 is generally responsible for processing a stream of network traffic, accumulating the results for a time window, compressing the results (as described herein), and sending the compressed results to the first computing device 102. The first computing device 102 is generally responsible for decrypting the results (as described herein) and performing identification on the results, including determining matched signatures (as described herein).

Figure 10:
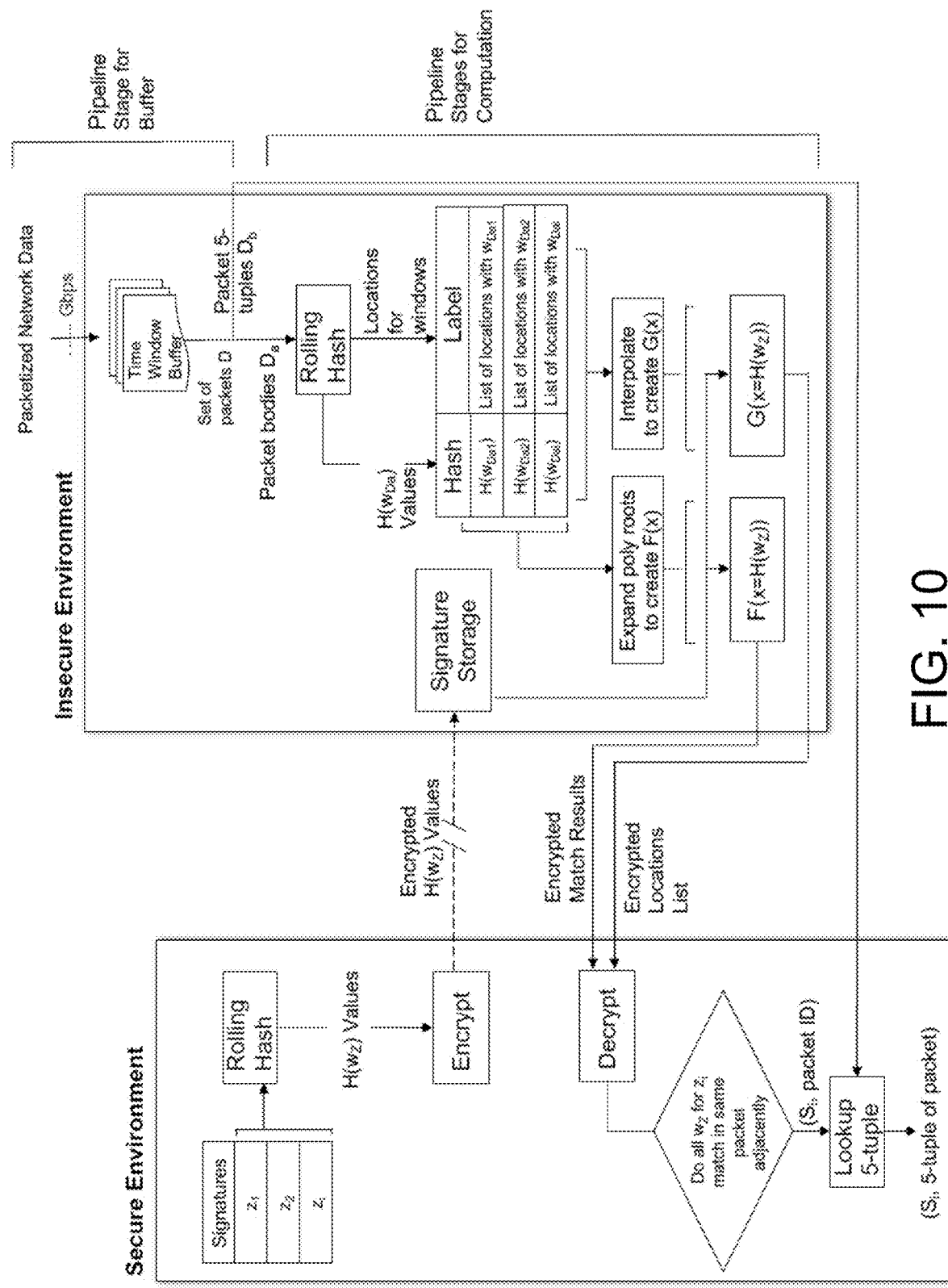
FIG. 10 illustrates a diagram of an example high-level overview of an approach to confidential deep packet inspection by the system of FIG. 1.

The confidential string-matching problem, described above, and the confidential DPI problem share many similarities. They search for a set of patterns in a collection of strings. Described herein is how the confidential string-matching problem can be mapped to the confidential DPI problem. FIG. 10 illustrates a diagram of an example high-level overview of an approach to addressing the Confidential DPI problem by the system 100.

The Agency's signature set $Z \subset \Sigma^*$ can be directly treated as the pattern set P in confidential string-matching 200, described herein. Observe that instead of a text string s, the DPI problem has a continuous stream of packets, where each packet contains a packet body and its packet 5-tuple. This stream can be segmented using a time interval. The problem can be resolved for each segment one-by-one. As the stream of packets is continuous, the collection of the segments can be pipelined with the determination on collected segments. For each segment, instead of one string to search in the confidential string-matching protocol, in confidential DPI there will be multiple strings to search. Therefore, all packet bodies are fingerprinted across all packets in the segment.

In the confidential DPI problem, the Agency needs to know which signature matched which packet (5-tuple) and where it matched within the packet (packet offset). This implies that for each query, the Host needs to return the set of packet 5-tuple and offsets where the query matched. The packet offsets can be encoded into the label ciphertext in the same way as the location in the confidential string-matching problem. However, in an example, in Internet Protocol version 4 (IPv4), a single packet 5-tuple can be 13 bytes; which in the HE approach used in the confidential string-matching problem requires multiple (e.g. four) ciphertext coefficients to store, leading to additional multiple label ciphertexts per match for each query ciphertext. Also, since the system 100 does not know how many matches will happen, it can be assumed that there are the maximum matches, and that this many label ciphertexts can be sent. In some cases, to avoid sending a large quantity of label ciphertext, the Host sends back 5-tuples for all packets unencrypted. The label ciphertexts can, in addition to the packet offsets, contain a set of IDs to identify each matched packet. Once the Agency decrypts the label ciphertext, it can use the ID to obtain the 5-tuple from the packet 5-tuple list. Therefore, during interpolation, each location in the label for a fingerprint is of the form $\overline{\omega} = \{ID_{packet} \| offset\}$. Note that concatenation of the ID and offset in this order allows the adjacency checking in the string-matching system to function unmodified; i.e., the system 100 can check if two windows are adjacent to each in the same packet. After the Host performs string-matching, the Agency obtains a list of matched signatures and associated packet IDs and offsets. The packet IDs can be converted to packet 5-tuples by looking them up in the list of 5-tuples.

The same optimizations applied in the confidential string-matching, described above, can be applied in the confidential DPI; for example, data compression. In some cases, to satisfy the real time processing requirement for DPI, pipelining can be used to break the computation process into multiple stages, where each stage has a full time window for its own processing. This allows the overall process to be fitted within the specified time window, for example, where the hardware resources can afford to run the stages simultaneously.

Figure 11A:
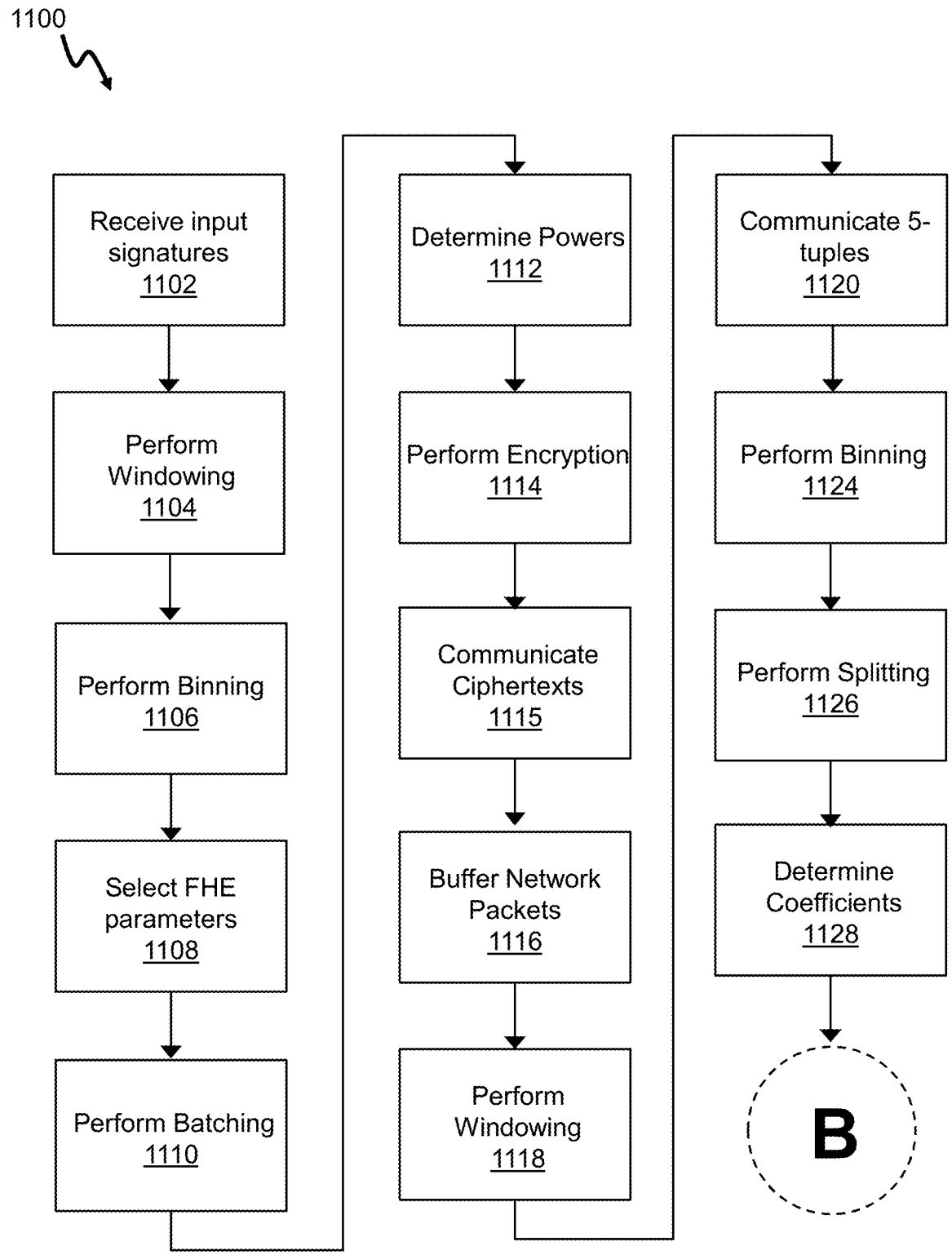
FIGS. 11A and 11B are a flowchart of a method for confidential deep packet inspection using confidential string-matching, in accordance with an embodiment.
Figure 11B:
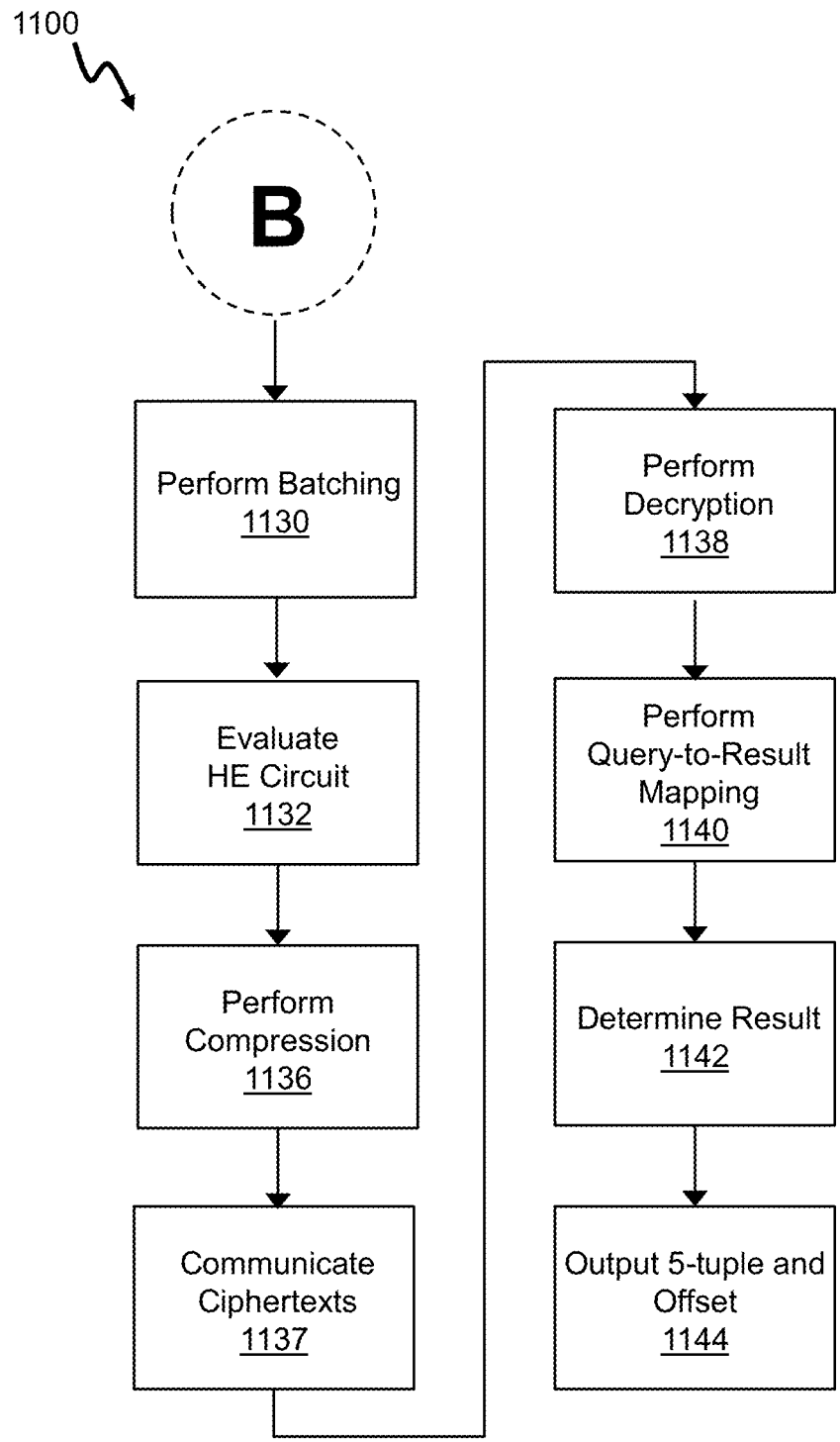

FIGS. 11A and 11B illustrate a flowchart diagram of a method for confidential deep packet inspection using confidential string-matching 1100, in accordance with an embodiment. In some cases, the alphabet $\Sigma$ can consist of 0 and 1 ($\Sigma = \{0,1\}$). In other cases, the alphabet can comprise any suitable set of digits (including negative), characters, and/or symbols as part of the alphabet.

At block 1102, the first input module 118 receives an input signature set $Z \subset \Sigma^*$, for example, from the input interface 106, the database 116, or the network interface 114. The input pattern comprises a set of signatures Z, where each signature consists of elements from the alphabet $\Sigma$ and has minimum length $\gamma$. Signatures can also be referred to as patterns, as in the method 200.

Similar to in method 200, except replacing P with Z, the first pre-processing module 120 performs windowing at block 1104, the first pre-processing module 120 performs binning at block 1106, the first pre-processing module 120 selects HE parameters at block 1108, the first pre-processing module 120 performs batching at block 1110, the first pre-processing module 120 determines powers at block 1112, and the first pre-processing module 120 performs encryption at block 1114 to determine encrypted ciphertexts. In some cases, this pre-processing can take place offline, when the first computing device 102 is not necessarily connected to the network 130. At block 1115, the network interface 114 communicates the ciphertexts to the second computing device 152.

At block 1116, the packet module 174 buffers the network packets within a specified time interval to form a list of packets D={(a, b)|a⊂Σ*, b⊂Σ*}; where each element in D is an ordered pair of packet body (a) and packet 5-tuple (b). The packet body and the 5-tuple consists of elements from the alphabet Σ and have a minimum length γ. After a complete time interval passes, the packet module 174 forwards the collected packets to be processed and starts buffering the packets in the next time interval.

At block 1118, the packet module 174 engages with the second windowing module 176 to perform windowing. In some cases, as part of block 1118, the second windowing module 176 uses the fixed-size windowing approach for all packet bodies in the packets D by applying Rabin-Karp to hash each ω-sized window of the packet bodies, to form set of hashes X using agreed upon first hash function $h_1$ which maps an ω-sized window to a value in the range [0, 2º). In this way, for all a∈$D_a$, it uses Rabin-Karp to hash each ω-sized window of a, to form set X={$h_1(w_a)$|∀$w_a$∈a, ∀a∈$D_a$} using agreed upon first hash function $h_1$: $\{0,1\}^w \mapsto [2^o]$ In some cases, as part of block 1118, the second windowing module 176 performs hybrid windowing using the method 800, as illustrated in the flowchart of FIG. 8. Using the method 800, the second windowing module 176 determines hash values for each ω-sized window of all packet bodies in the packets D, where ω is between $ω_l$ and $ω_h$, to form a set of hashes for X using the first hash function $h_1$, i.e., set X={$h_1(w_a)$|∀$ω_a$∈a, ∀a∈$D_a$, ($ω_l$←$ω_w$≤$ω_h$ ∨ $ω_w$=$ω_d$)}.

At block 1120, the packet module 174 communicates all packet 5-tuples for the packets $D_b$ to the Agency.

Similar to in method 200, the second pre-processing module 170 performs binning at block 1124 and the second pre-processing module 170 performs splitting at block 1126. In some cases, this pre-processing can take place offline, when the second computing device 152 is not necessarily connected to the network 130.

Similar to in method 200, the second pre-processing module 170 determines coefficients at block 1128, except in this embodiment, the second pre-processing module 170 labels polynomials differently. The second pre-processing module 170 interpolates the polynomial $G_{i,j}$ over $\mathbb{F}_t$ such that $G_{i,j}(x)=1_x$ only if x exists in T[i,j] ($G_{i,j}(x)=1_x ∀x∈G[i,j]$). Where $1_x$ is a set of unique locations for windows that hash to x ($w_x$) across all packet bodies, $D_a$. The unique locations are represented by the concatenation $\overline{ω}$={$ID_{packet}$||offset}. Where $ID_{packet}$ is the unique identifier of a packet in D, and the offset is the position, of the window that hashes to x, within the packet body. In other words, $ID_{packet}$ is the unique identifier of a packet in D, and offset is the position of the $w_x$ within the packet body.

Similar to in method 200, the second pre-processing module 170 performs batching at block 1130. Also similar to method 200, the homomorphic evaluation module 172 determines intersection by, for the $b^{th}$ batch received, homomorphically evaluating the HE circuit at block 1132. For each sub-bin, the homomorphic evaluation module 172 homomorphically evaluates the function: $f_{b,j}=F_{j,1}+Σ_{k=1}^ψ c_b^k · F_{j,k+1}$. And performs the same operation for $G_{b,j}$ and the label ciphertexts $g_{b,j}$ are denoted as such. At block 1136, for the $b^{th}$ batch received, the homomorphic evaluation module 172 performs compression. Similar to in method 200, at block 1137, the network interface 164 communicates the match ciphertext $u_b$, the label ciphertext $q_b$, and the ciphertext $h_b$ to the Agency. In some cases, $u_b$ and $q_b$ can be determined in a depth-optimal manner by the use of a multiplication tree.

Similar to in method 200, except replacing P with Z, the post-processing module 122 performs decryption at block 1138 and the post-processing module 122 performs query-to-results mapping at block 1140.

At block 1142, the post-processing module 122 determines the result for the confidential DPI. For each z∈Z, block 1140 will return a $\overline{ω}$={$ID_{packet}$||offset} for every location where z matched in the packet bodies of D. For each $\overline{ω}$, the post-processing module 122 retrieves the 5-tuple from the list of 5-tuples received earlier using the $ID_{packet}$. In some cases, the above post-processing can take place offline, when the first computing device 102 is not necessarily connected to the network 130.

At block 1144, the post-processing module 122 outputs the 5-tuple and the offset. The output includes $D_a∩Z$ and the 5-tuple $D_b$ corresponding to it, as well as the offsets of these signatures within the packets. In this way, the Agency outputs the signatures that are found in any of the packet bodies, the corresponding 5-tuple for those packets, as well as the offsets within the packets where the signatures matched.

Figure 12:
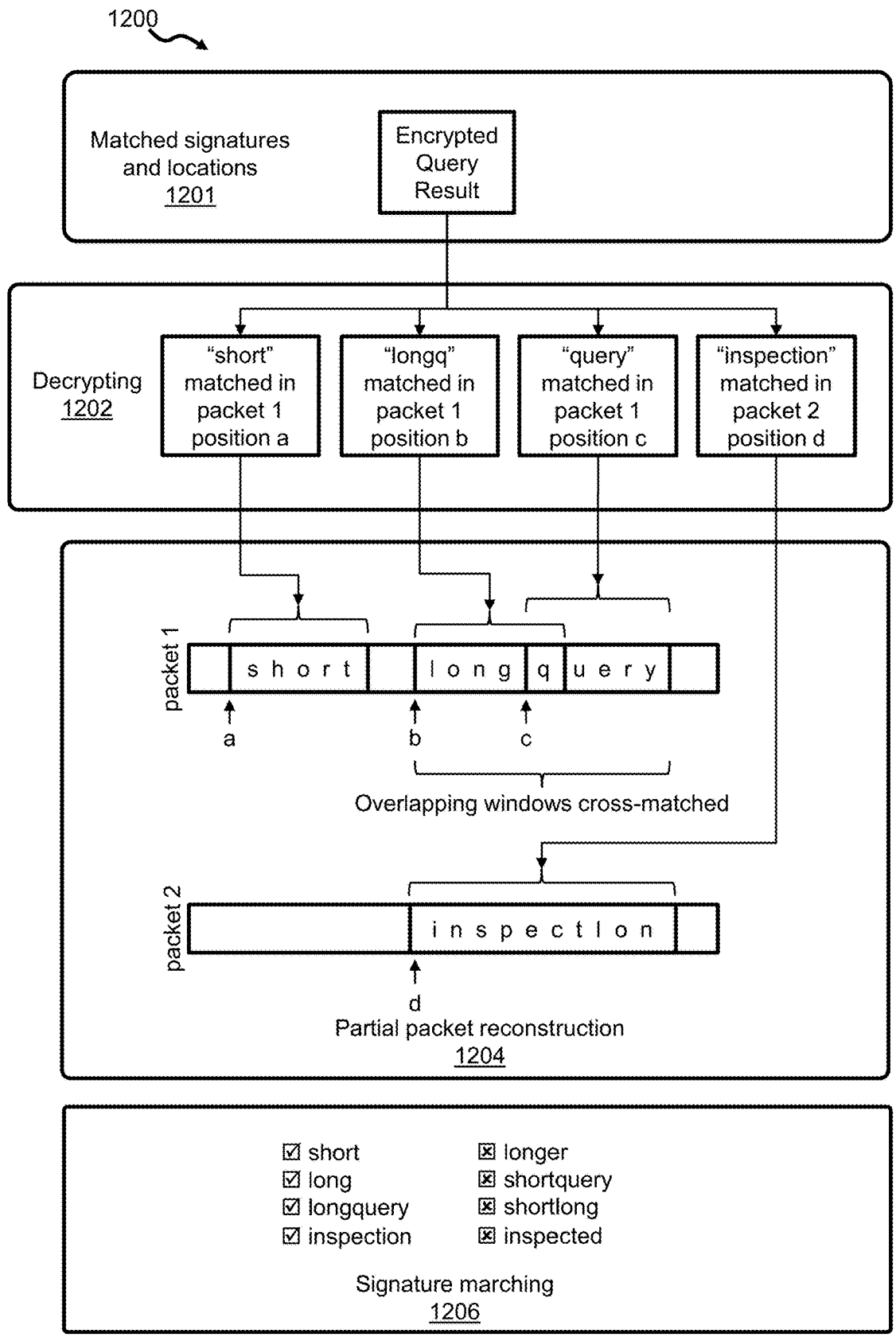
FIG. 12 illustrates a diagram of a result interpretation phase in an example confidential deep packet inspection (DPI) implementation.

FIG. 12 shows a block diagram of a result interpretation phase in a simplified example confidential deep packet inspection (DPI) implementation 1200. This example can be used to illustrate determination and outputting of results of confidential deep packet inspection (DPI) in an example deterministic implementation. Prior to determining and outputting results, at block 1201, the matched signatures and their associated locations in s are determined by the second computing device 152 (Host) using blocks 1102 to 1137 of the method 1100. Blocks 1202 to 1206 of this example can be performed by the postprocessing module 122 of the first computing device 102 (Agency), resembling blocks 1138 to 1144 of the method 1100 (similar to blocks 236 to 240 of the method 200). Block 1202 includes decrypting encrypted query results into a set of match string values, match packet IDs, and match offset positions. Block 1204 includes partially reconstructing packets that include matched strings in their matched positions. Block 1206 includes matching signatures over partially reconstructed packets using string matching algorithms, such as KMP or Aho-Corasick algorithm. In the example of FIG. 12, a search query of eight fingerprints is exemplified, including example strings of "short", "long", "longer", "shortquery", "longquery", "inspected", "inspection" and "shortlong". This example shows that after decryption at block 1202, two packets are partially reconstructed at block 1204; showing four matches in four positions. In this example, as part of signature matching at block 1206, the two matched packets 1 and 2 are searched to find four results. This example 1200 shows how an overlapping window can be cross-matched for "longq" and "query" to identify a match for "longquery". Furthermore, this example 1200 shows how four out of eight signatures are identified as matches.

In some cases of the method 1100, a limit can be applied on the number of matched locations for each window. Similar to the method of 200, applying such limit on the number of matched locations makes the method 1100 substantially more efficient in cases where patterns being searched for, p∈P, appear infrequently in the text corpus s.

In many cases, communication complexity and computation complexity may be taken into consideration for practical application of the method 1100, similar to the method 200, except for the following differences:

|X| as the number of unique windows from all packets, D. |Y| as number of unique windows from all signatures, Z.

In further cases, the system 100 can be used in, for example, network Intrusion Detection System (IDS), Intrusion Prevention System (IPS), and Network Security Monitoring (NSM) engine (e.g. Snort and Suricata).

In further embodiments, the system 100 can be used for regular expression (RegEx) patterns by windowing the pattern around the RegEx characters, finding those patterns and their respective offsets, and performing some post-decryption logic using the offsets to find if the RegEx matched. For a regular expression to be supported, each contiguous set of non-RegEx characters in a pattern is expected to be equal to or larger than the window size.

In an example for the "." wildcard:
RegEx Pattern: "abc.efg"
Text Body: "xyzabcyefgzxyz"
Window Size ω: 3
A search can be performed for "abc" and "efg" resulting in offset 3 and 7 respectively. If "abc" has offset x and "efg" has offset x+4, then the RegEx pattern is satisfied.

In another example for the ".*" wildcard quantification:
RegEx Pattern: "abc.*efg"
Text Body: "xyzabcyxzyb53dfxfefgzxyz"
Window Size ω: 3
A search can be performed for "abc" and "efg" resulting in offset 3 and 17 respectively. If "abc" has offset x and "efg" has offset x+k, where k>=a, then the RegEx pattern is satisfied.

In another example for the "?" quantifier:
RegEx Pattern: "abcy?efg"
Text Body: "xyzabcyefgzxyz"
Window Size ω: 3
A search can be performed for "abc", "bcy", "efg" resulting in offset 3, 4 and 7 respectively. If "abc" has offset x and only if the following conditions is true: (1) "efg" has offset x+4 and "bcy" has an offset x+1, and (2) "efg" has offset x+3, then the RegEx pattern is satisfied.

In another example for the "*" quantifier:
RegEx Pattern: "abcy*efg"
Text Body: "xyzabcyyyyyyyyyyefgzxyz"
Window Size ω: 3
A search can be performed for "abc" and "efg" resulting in offset 3 and 17 respectively. A search should also be performed for the possible windows that would result in the RegEx pattern match, namely: "bcy", "cyy", "yyy", "yye", "yef". Using the offsets for these windows from the search, it can be extrapolated, the information about the contents in the text body between any "abc" and "efg" windows; and hence, determine if the RegEx pattern is satisfied. The "+" as well as the "{n}", "{min,}" and "{min, max}" quantifiers can be handled in a similar way.

In another example for the "|" construct for "or" with grouping "()":
RegEx Pattern: "abc(mno|pqrs)efg"
Text Body: "xyzabcmnoefgzxyz"
Window Size ω: 3
A search can be performed for {"abc", "efg"} as well as the windows in grouping {"mno", "pqr", "qrs"} resulting in offset 3, 9, 4, Ø, Ø respectively. If "abc" has offset x and one of the following is true: (1) "mno" has offset x+1 and "efg" has offset x+k, where k==len("mno"), and (2) "pqr" has offset x+1, "qrs" has offset x+2 and "efg" has offset x+j, where j==len("pqrs"), then the RegEx pattern is satisfied.

In another embodiment, the system 100 can remove the windowing on the patterns. Instead of searching for fingerprints of the windows from a pattern, the system 100 can search for the fingerprint of the whole pattern. In this case, the system 100 can generate a single fingerprint for each pattern. The system 100 can also generate a fingerprint for each substring in the text corpus that has the potential to match with any of the patterns. This implies that a range is to be defined for the possible pattern length [γ, υ], and translates to creating fingerprints for all substrings in the text corpus that have length in the range [γ, υ].

This above approach allows for exact matches (assuming negligible collision probability) of the patterns without the need for offsets; as now there is no need to verify adjacency of the windows from a pattern as in the prior. It also allows for smaller label size because the system 100 is now matching fingerprints of a pattern. The label will indicate the locations of the full pattern as opposed to locations of a window from the pattern. This translates to potentially less locations as window sizes are smaller than the patterns; and therefore, have higher probability for matching. This also means generally no false negatives due to the scenario where all matched locations for the pattern fit in the label (of pre-determined size). Whereas in the windowing approach, the matched locations for a window of the pattern may not fit in the label. However, this can come at the cost of $N_x$, the size of the set of fingerprints from text corpus, increasing with the pattern length range; i.e., $N_x \propto (υ-γ)$. Therefore, this approach is particularly apt when the pattern length range is small and the bandwidth for the label ciphertext is limited. This approach is also particularly applicable to confidential DPI, as described herein, with a fingerprint generated and searched, for each signature.

In another embodiment of string-matching, the patterns can be windowed in a different way. Instead of fingerprinting each possible ω-sized substring in a pattern, the system 100 only fingerprints the non-overlapping ω-sized substrings in the pattern; i.e., the pattern is segmented into ω-sized substrings. For patterns where the pattern size is not divisible by a, the last window of the pattern can overlap. This is advantageous for scenarios where window size is much smaller than average pattern length as it substantially reduces the Receiver's fingerprint set Y size; i.e., it reduces the number of windows to search for. In this embodiment, if the offsets are not communicated (i.e., the probabilistic result interpretation is used), then the probability of getting a false positive (the windows of a pattern exists in the text corpus, but the pattern itself does not) is substantially higher. The aspects of this embodiment can also be compatible with a variation of the confidential DPI embodiment.

As an example, the pattern "abcdef", using the embodiment of method 200, the windows will be:
"abc"
"bcd"
"cde"
"def"

If the pattern exists in the text corpus, offsets for the window will be x, x+1, x+2 and x+3 respectively.

In the above embodiment, the system 100 only needs to search for non-overlapping windows:
"abc"
"def"

If the pattern exists in the text corpus, offsets for the windows will be x and x+3 respectively; which fully defines that "abcdef" existed in a text corpus at location x.

In another embodiment, an R-extension can be used for the string-matching. For the probabilistic implementation described herein, the probability of getting false positives (cases where a match is falsely reported for a pattern that does not exist in the text corpus) can be substantially reduced by incorporating window adjacency information into the query. Doing so will result in the Sender effectively searching for the full pattern instead of substrings from the pattern.

False positives generally come from the loss of adjacency information between windows when the patterns (and text corpus) are windowed and fingerprinted into a set X (& Y). In this embodiment, the window adjacency information can be incorporated by foregoing the formation of set X and Y and combining the windowing and binning as follows:

As the window is rolled across the patterns, for each window ($w_p$), the window's fingerprint ($h_1(w_p)$) is inserted into the first table at location $h_2(h_1(w_p))$ and the successive window's fingerprint (in the pattern) is inserted in each subsequent table at the same location $h_2(h_1(w_p))$. Therefore, the first table is identical to the table described with respect to the other embodiments, while the other tables contain information about (R−1) windows that are adjacent to windows with fingerprints in the first table.

Instead of a single ciphertext representing a query batch, a query batch is represented with R ciphertexts as there are R tables instead of a single table.

The same windowing and binning can be applied on the text corpus to create R tables with fingerprints of windows from the text corpus. In this variation, the system 100 can then attempt to match both the windows and their adjacent windows by mapping the R query ciphertexts to the R respective tables. The results from the search on each table are added together such that a match only occurs if both the window and its adjacent windows are found in the text corpus. Thus, for a pattern containing exactly R windows, the probability of false positives is significantly reduced.

For the case where a window does not have R−1 adjacent windows in the pattern, zeroes can be used to denote "no window" in the subsequent tables. A zero can be added to every bin on the text corpus side (before alpha splitting) so that a search for zero in any of the bins will result in a match; and therefore, will not factor into the addition of the results. Thus, translating to a significant reduction in the probability of false positives for patterns with less than R windows.

For the case where a pattern has more than R windows, the results from each set of R (or less) windows from the pattern can be combined together. The overall probability of false positives will be lower compared to the method 200 but higher compared to the case where the pattern has R or less windows.

If the location of the patterns in the text corpus is required, the embodiment of method 200 using labels remains unchanged; i.e., the system 100 only needs to evaluate the label results for the first ciphertext in the R ciphertexts batch. The G(x) interpolation polynomial is not constructed for any bins in the tables besides the first table on the text corpus side.

Figure 13A:
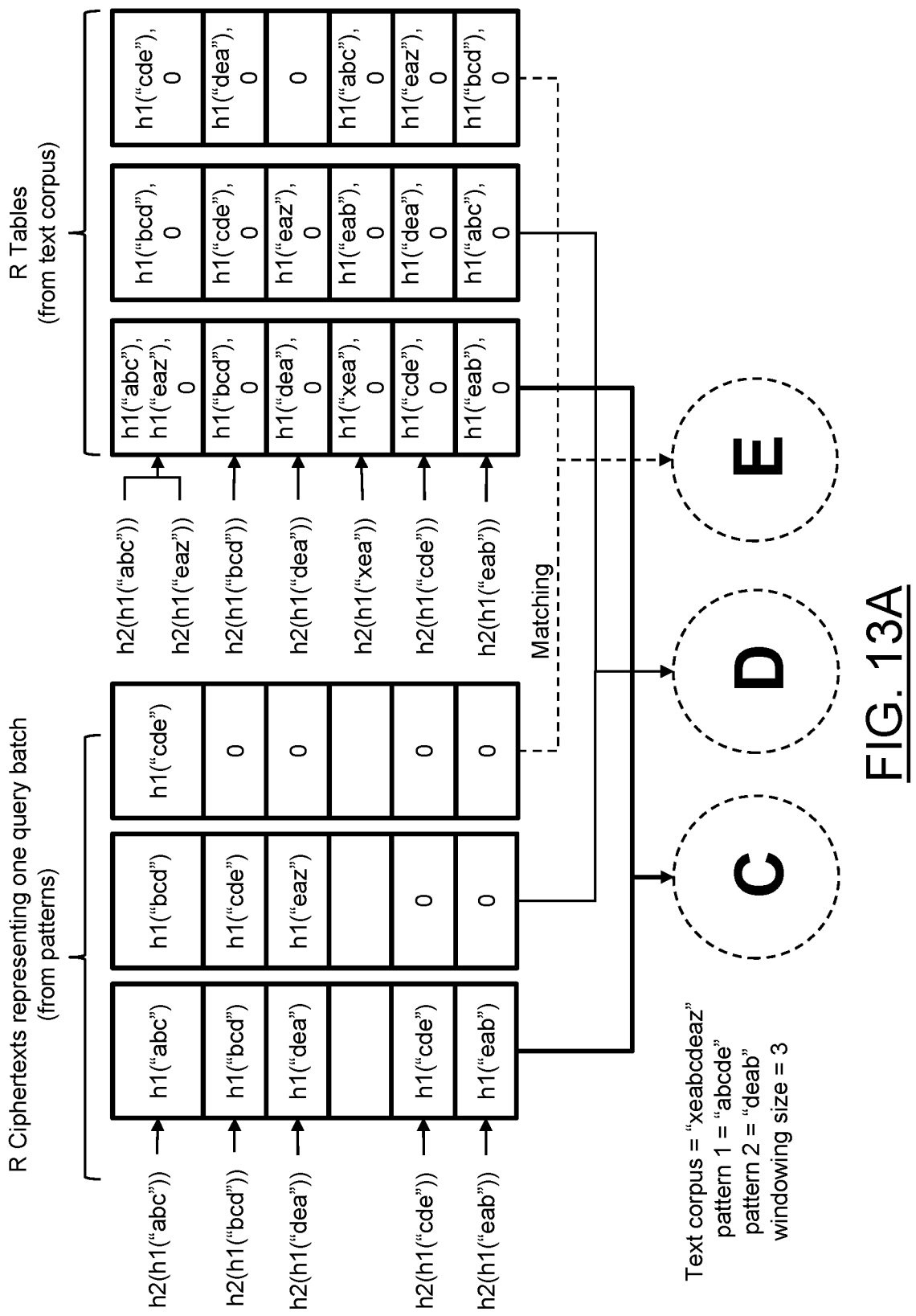
FIGS. 13A and 13B are a diagrammatic example of confidential string-matching with R-extension.
Figure 13B:
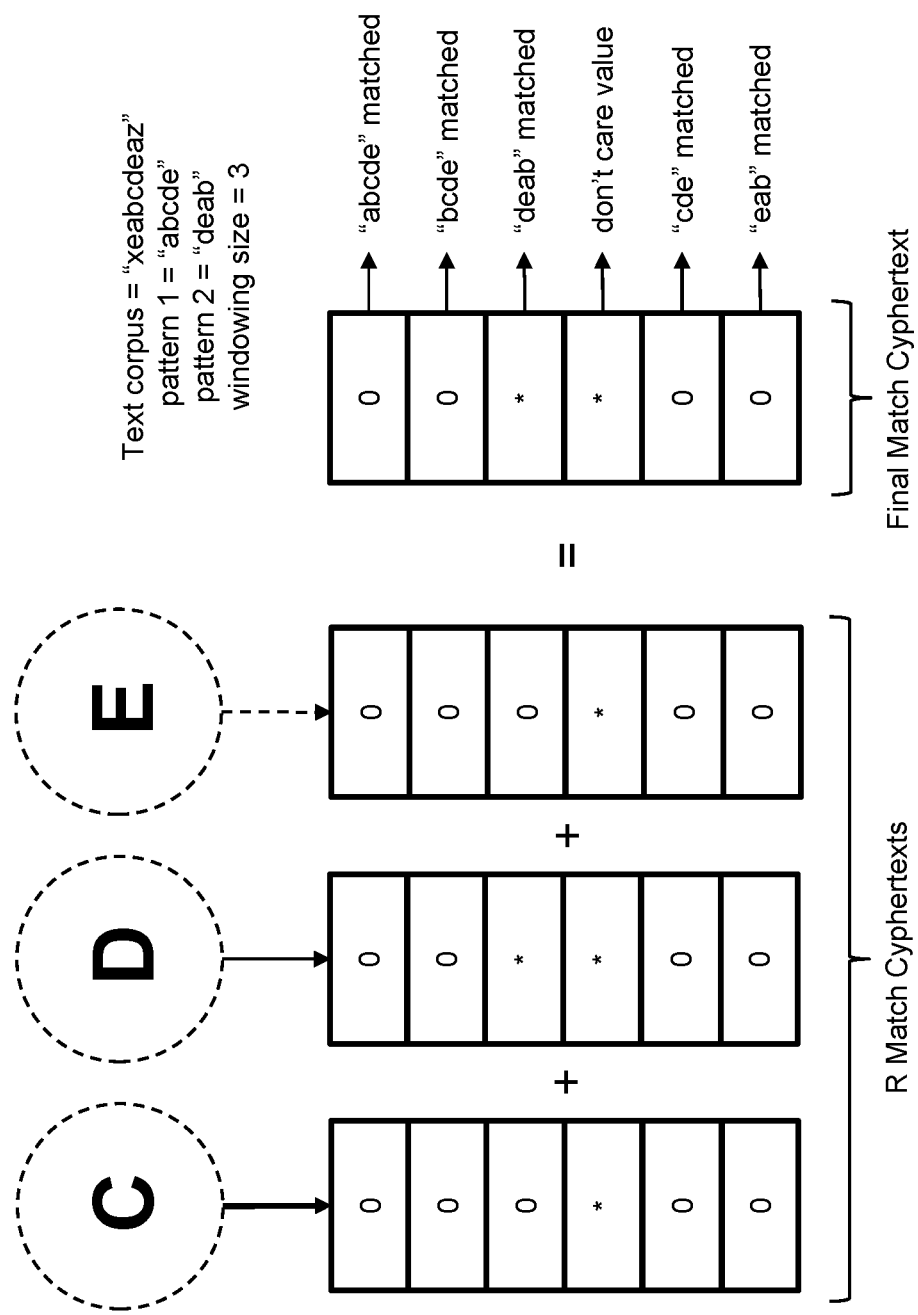

FIGS. 13A and 13B illustrate an example of the R-extension embodiment. FIGS. 13A and 13B show an example of confidential string-matching with R-extension using $h_1$ for fingerprinting windows and $h_2$ for binning the fingerprints to form query ciphertexts and tables to search. The pattern "abcde" is windowed across the R query ciphertexts so that the results for the search of "abc", "bcd" and "cde" can be added together; only returning a match if they were adjacent in the text corpus. The figure also highlights that the pattern "deab" is not found even though the windows "dea" and "eab" exist separately in the text corpus. Note that the "*" character in the figure denotes an arbitrary non-zero value, which depending on the context, can indicate "no match" or "don't care".

As shown in FIGS. 13A and 13B, the pattern "abcd" occupies three rows across the query ciphertext to find if "abcde", "bcde" and "cde" exist in the corpus respectively. From a matching perspective, this is redundant and the rows to search for "bcde" and "cde" can be removed as the search for the pattern is complete with just the first row. However, when the location of the pattern is also needed (achieved via labels), the other rows will be required as the first row will return all locations where "abc" exists instead of only the locations where "abcde" exist. Combining the locations from "bcde" and "cde" will give the locations where only the pattern exists.

In some cases, the text body (or network traffic in case of DPI) can be treated confidential as well. This can be very useful in the case that the text body and the queries are encrypted using the same key pair (public and secret keys). For example, a bank encrypts its sensitive databases and uploads the encrypted contents to the cloud to allow the bank agents to perform encrypted queries on such databases. Additionally, this allows for cloud migration strategies.

In some cases, the system 100 only requires knowing if a pattern exists in a corpus, not its location or any other metadata associated with its existence. This will eliminate the "Labelled" function altogether and use only the function F(x).

In some cases, the system 100 can support binary operations (e.g., AND, OR, and the like) between multiple signatures by performing these steps as a post-processing step.

In some cases, for confidential DPI, the system 100 can enable signature flags based on signature offset within the packet by taking advantage of the packet offset information retrieved by the label.

In some cases, other techniques (e.g., Chinese Remainder Theorem (CRT) and Single Instruction Multiple Data (SIMD)) can be used to break down the computation on wide integers (for example hundreds or even thousands of bits) into multiple computations over narrower numbers that can fit into computer registers and the processor arithmetic logic unit (for example 64 or 128 bits).

In some cases, the system 100 can make use of a fixed-sized time interval buffering to enable processing on a continuous stream. The time interval can be variable-sized and adjusted dynamically based on the statistical properties of the input traffic. Additionally, if the input is non-continuous, time interval buffering may not be required.

In some cases, approaches described herein can be less efficient in terms of communication cost, as the number of result ciphertexts increase by a factor of $\alpha$. Instead, the system 100 can remove the factor $\alpha$ and have larger bins. However, this will increase the interpolation time. This approach can be useful for the case that the text corpus being searched is static. In this case, interpolation can be performed offline.

In some cases, parallelization and/or pipelining can be not performed. In these cases, the approach may take longer to run, but can allow for running on more platforms (e.g., internet-of-things, embedded, and mobile processors).

In some cases, the labels can be communicated using:
Private Information Retrieval (PIR): In the case that the desired "labels" are large, for instance files, an alternative approach can be taken. Only the existence of a match is determined along with a unique ID corresponding to the desired "label" using the PSI routine described herein. Note that the unique IDs used should be much smaller than the desired "label". Then, the unique IDs are utilized as keys to retrieve the "label" using an HE private information retrieval (PIR) routine. This approach will be generally more efficient in regards to computation and communication when the "labels" are all similarly large in size.

Oblivious Pseudo Random Function (OPRF): An OPRF can be applied to both the signature windows and the text corpus windows. The OPRF processing can be performed using exponentiation or an oblivious transfer to hash the items on both sides. Additionally, the labels can be encrypted by applying the OPRF hash function. All the encrypted labels can then be communicated back to the Agency as they will be pseudo-random in the Agency's view. Sending all the labels will generally increase the communication cost; however, it is also possible to combine the OPRF technique with the PSI routine.

In both method 200 and method 1100, there is polynomial creation (expansion) and interpolation. There are several approaches that can achieve this, each with different space and time complexities. It is appreciated that at least some of the order and necessity of the steps and limitations of the method 1100 can be varied or changed as appropriate, while retaining the technical contributions of the method 1100.

In one such approach for polynomial creation, to create the polynomial using convolution, several smaller convolution operations are performed using all the roots of the polynomial. Each root is placed in an array of size 2 where index 0 is a 1 and index 1 is the negative of the root in the finite field space. Then all the arrays are convolved in sequence.

$$\text{Array of Coefficients} = [1,-r_1]*[1,-r_2]*[1,-r_3]* \ldots *[1,-r_n]$$

The time complexity of the convolution is $O(n^2)$.

In another such approach for polynomial creation, Vieta's algorithm uses the sum of roots and sum of products equations and generalizes them to find all the coefficients of the polynomial. The time complexity of Vieta's algorithm is also $O(n^2)$ but its constant factor is smaller, leading it to be faster in practice.

In another such approach for polynomial creation, number theoretic transform (NTT) works by transforming the roots of the polynomial into a different space so that the convolution operation is cheaper, making it equivalent to multiplication. This results in massive speedups in time with an overhead cost of converting to and from this space. The time complexity of the NTT algorithm is $O(n \cdot \log(n))$.

In another such approach for polynomial creation, Kronecker substitution (KS) can be used to treat each array in the convolution as its own second degree polynomial. KS can be used to multiply the polynomials extremely quickly for all pairs of polynomials to generate n/2 third-degree polynomials. This process is repeated with all the third-degree polynomials to generate fifth degree polynomials, and so on, until the coefficients of the final $n^{th}$ degree polynomial are generated. The time complexity of the best performing KS algorithm is $O(n \cdot \log(n))$ but it has been shown to be faster than NTT up to polynomials of certain degree (e.g., polynomial degree $2^{13}$)

For polynomial interpolation, a fast implementation is beneficial to realize a practical, high performance implementation. The goal of polynomial interpolation is to fit an $n^{th}$ order polynomial to n data points. It can be shown that such a polynomial exists and that there is only one polynomial that exactly fits those points. As described below, provided are examples of different approaches for interpolating a polynomial given a set of x and y points.

In one such approach for polynomial interpolation, a Vandermonde matrix can be used. This approach consists of constructing a linear system of equations and solving them. The system of equations can include:

$$Xa=Y$$

where X and Y are known. The vector a can be determined by inverting X:

$$a=X^{-1}Y$$

This gives us the coefficients for the interpolating polynomial however the time complexity of matrix inversion is $O(n^3)$.

In another such approach for polynomial interpolation, a Lagrange approach can be used. The Lagrange approach of interpolation involves creating basis polynomials $L_L(x)$. Each basis polynomial is constructed so that it goes through 0 for all of the x values except the $k^{th}$ for which it has the value 1. Each basis polynomial is then scaled by y, so the basis polynomials go through y for the point in x they correspond to, and zero for all the other points. These polynomials are then added to get the final result. The runtime of this algorithm is $O(n^2)$.

In another such approach for polynomial interpolation, a Newton approach can be used. The Newton approach of polynomial interpolation relies on computing "divided differences". It is similar to the Lagrange approach in that it is a linear combination of basis functions, but in this case the basis functions are Newton polynomials. The runtime of this algorithm is also $O(n^2)$.

In another such approach for polynomial interpolation, fast polynomial interpolation over finite field can be used. Fast implementations of the polynomial interpolation algorithm take advantage of the mod space in finite fields. An example of the fast Lagrange approach can be used, which relies on fast polynomial multiplication and division. In addition, it also uses the divide and conquer technique. The complexity of this algorithm is $O(n(\log n)^2)$. A sub-product tree of weights can be constructed efficiently in order to compute the Lagrange basis functions. The implementation is further optimized by storing and reusing the computed Lagrange basis functions, whenever the set of x values remains constant and only the y values are updated.

In some cases, permutation based hashing can be used for method 200 and method 1100. The length of the items that can be encoded into a coefficient of an HE ciphertext is generally limited by the value of the plaintext modulus t. To mitigate this limitation, permutation based hashing can be applied on the items stored in the hash table. This technique compresses the bit string of an item by encoding a portion of its bits into the bin location. The hashing can be applied to signature windows, and packet windows as part of the binning; and consequently, only the compressed windows are encrypted in the ciphertext. The size of the bit length reduction achieved with this hashing technique depends on the number of bins used in the hash table.

While the above embodiments generally describe communication between two computing devices, such as the first computing device 102 and the second computing device 152, it is understood that the functions of the system 100 can take place on a single computing device. For example, for performing confidential string matching of method 200 on an encrypted database on the computing device.

In further embodiments, if there is a very large database of patterns P to be searched, the first preprocessing module

120 and/or the second preprocessing module 170 can split up the database into multiple "subsets". Each subset can be treated as a completely independent database to be searched. This advantageously allows for parallelization of the different subsets on different threads or different systems. Additionally, in an example where there are k subsets, and there is an item that cannot be added to any of the subsets due to collisions as a result of hashing (using the first hash function $h_1$), the first preprocessing module 120 and/or the second preprocessing module 170 can insert this item in subset k+1 (i.e., create a new subset) which can be used to hold colliding items.

Advantageously, embodiments of the present disclosure leverage homomorphic encryption (HE) to satisfy security constraints of the confidential string-matching problem. The compression technique can be applied in association with hardware acceleration techniques to transform the difficult technical problem into a practical solution.

Generally, labelled PSI algorithms require that database elements and query terms be hashed in order to normalize inputs and ensure they can easily be encoded into HE polynomials. As a result, there is a chance for two different input/query terms to be hashed to the same value, referred to as a hash collision. Increasing the size of t reduces the hash collisions, but at the same time reduces the multiplicative depth d. In many cases, to choose the minimum size of t that minimizes collision rate, an Expected Number of Collisions can be used.

In some cases of the method 200 and the method 1100, binning functions can be evaluated on the hashed values of input terms. As such, in the case that two different query inputs have the same compressed hash value, they are placed in the same set of bins guaranteeing a collision within each bin involved. The Expected Number of Collisions after inserting k unique elements into hash space of size m, in such cases, is calculated as:

$$\text{Expected Number of Collisions} = k - m\left(1 - \left(\frac{m-1}{m}\right)^k\right)$$

In some cases of the method 200 and the method 1100, in order to improve the expected number of hash collisions, binning hash functions can be applied to the original string value instead of the compressed hash value of the input terms. As such, in the case that two different query inputs have the same compressed hash value, there is still a high chance that they will be placed in different bins. If the binning is successful in placing colliding elements in separate bins, the polynomial interpolation across each bin will be feasible. An Improved Expected Number of Collisions can be calculated as:

$$\text{Improved Expected Number of Collisions} = \left(\frac{k}{n} - m\left(1 - \left(\frac{m-1}{m}\right)^{\left(\frac{k}{n}\right)}\right)\right) \times n$$

where k is the number of database input terms, m is the size of the hash space and n is the polynomial degree equal to the total number of bins.

For example, in an experiment with a relatively large plaintext modulus of t=51 bits, $m=2^{t-1}=2^{50}$, and n=32,768, the expected number of collisions was equal to 0.013 for 1 billion database elements (i.e. $k=10^9$).

In addition to the Boolean recall, another accuracy matric for the method 200 and the method 1100 can be precision; which is defined as:

$$\text{precision} = \frac{TP}{TP + FP}$$

where TP, and FP, refer to the number of true-positive and false-positive, respectively. Generally, the only factor contributing to false positives is hash collisions. There are two cases of hash collisions, one between the database elements and another between a database and a query element.

In some cases of the method 1100, mitigation strategies can be utilized to ensure the effect of collisions remain negligible. For example, in order to mitigate database-database collisions, packets that contribute to database-database collision within a defined time window of processing, for example within a one-hour window, can be inserted into the next time window of processing, to ensure uniqueness of hashes.

Another type of collision is Query-Database Collision, which happens when the hash of one of the non-matching query elements collides with one of the database elements. The false positive probability $P_{FP}$ of one query colliding with any of the k elements already in the database, divided on n bins, and the hash space m, is:

$$P_{FP} = \frac{(k/n)}{m} = \frac{k}{mn}$$

For example, in an experiment with $m=2^{50}$, $k=10^9$ and n=32,768, the false positive probability was $P_{FP}=2.71\times 10^{-11}$. Paired with the fact that a query-database collision can only happen at a specific location beside other windows that also match, the precision is equal to 1.0 (or 100%), which means that every string match in the output of the confidential search appears in the ground truth as well.

In some cases of the method 1100, similar to the limit on the number of matched location (supported repetitions) for the method 200, the number of matched 5-tuples that can be returned for each distinct window can be limited. Match locations of windows that repeat more than the supported repetitions of the Labelled PSI algorithm are not reported in the results. Therefore, searching for highly repeated signatures may yield false negative results. By increasing the number of labels, the system 100 can return more windows of the network traffic that can be searched.

Figure 14A:
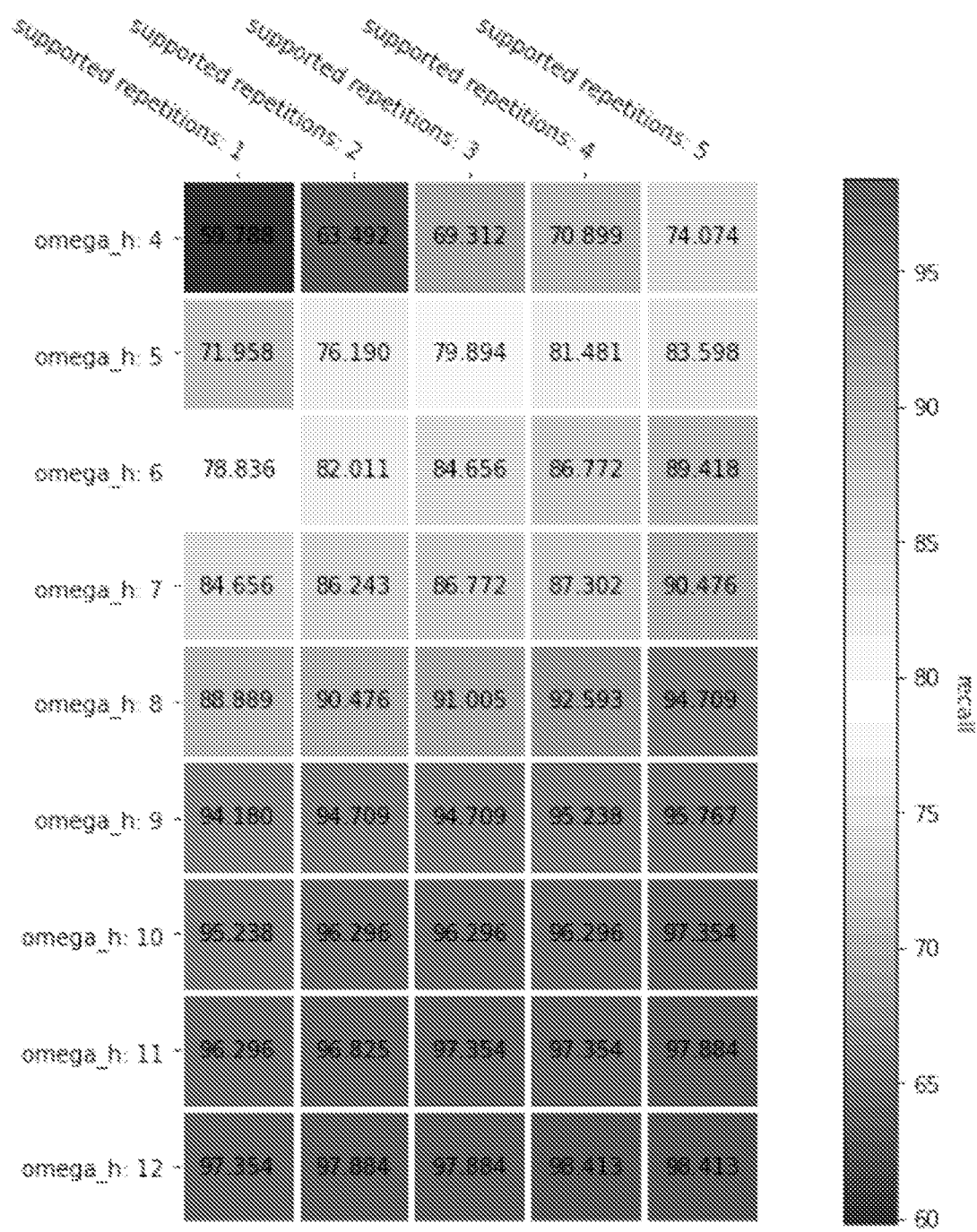
FIG. 14A demonstrates a sample heatmap of Boolean recall percentage for several complete processing cycles on a sample experimental data in accordance with an example experiment.
Figure 14B:
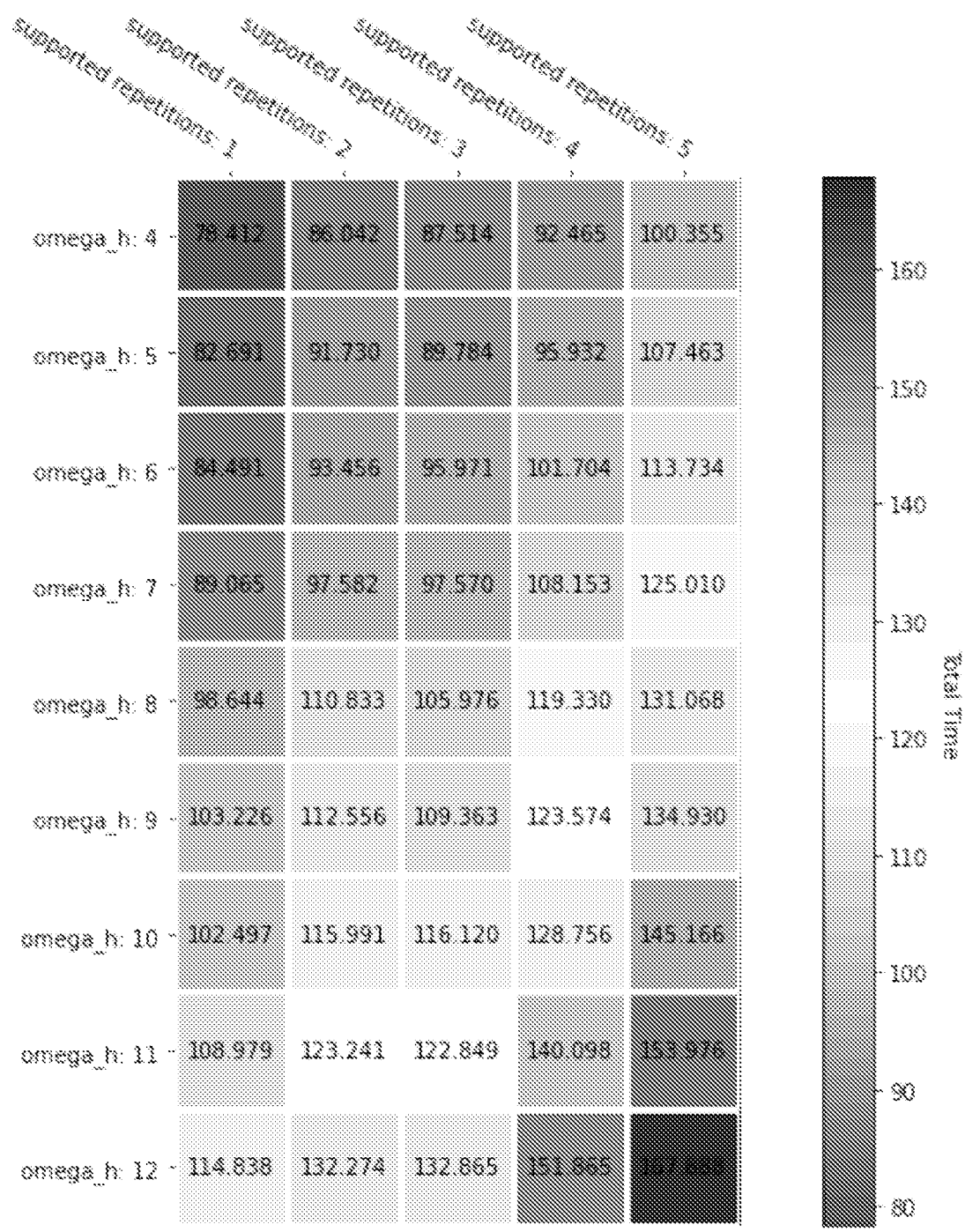
FIG. 14B demonstrates a heatmap of execution time of several complete processing cycles on a sample experimental data in accordance with the example experiment of FIG. 14A.

FIGS. 14A and 14B provide an exemplary approach for selection of the size of $\omega_h$ and the number of repetitions; however, any suitable approach for selecting these values can be used. In this example, FIG. 14A illustrates a heatmap of Boolean recall percentage for testing a range of different sizes $\omega_h$, and a range of supported repetitions, in an example implementation. The heatmap is generated based on several experimental executions of the method 200 and the method 1100, using variable configurations on a sample experimental data. Similarly, FIG. 14B illustrates a heatmap of execution time of a complete processing cycle for similar pair of parameters for $\omega_h$, and the supported repetitions. In any given example implementation, the combination of FIGS. 14A and 14B can be produced using sample experimental data. Using these two heatmaps, a desired configuration pair for $\omega$ and supported repetitions can be selected to configure the method 200 or the method 1100 and achieve a desirable balance between expected Boolean recall and expected execution time.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference

The invention claimed is:

1. A method for hybrid windowing for string-matching of input patterns to a corpus, the method executed on at least one processing unit, the method comprising:
    establishing a first window size of a window and a hash function, wherein the window comprising a string of characters between two indexes in the input patterns, wherein the size of the window is equal to number of characters between the two indexes;
    performing hashing on the input patterns having a size within a given range using dynamic-sized windows to determine a dynamic-windowed hash set, wherein the given range comprises the input pattern having a size between a second window size and the first window size, wherein the size of each dynamic-sized window is based on the size of respective input pattern, and wherein the hash function maps each value of the input patterns to a value in the given range;
    performing hashing on the input patterns having a size outside the given range using fixed-sized windows to determine a fixed-windowed hash set;
    combining the dynamic-windowed hash set and the fixed-windowed hash set to determine a combined hash set; and outputting the combined hash set for use in confidential string-matching.

2. The method of claim 1, further comprising establishing a second window size, and wherein the given range comprises patterns having a size between the second window size and the first window size.

3. The method of claim 1, wherein the given range comprises patterns having a size less than the first window size.

4. The method of claim 1, wherein the dynamic-sized windows have a plurality of different sizes for respective pattern sizes.

5. The method of claim 1, wherein the size of each dynamic-sized window is equal to the size of the input pattern.

6. The method of claim 1, wherein the combined hash set comprises the union of the dynamic-windowed hash set and the fixed-windowed hash set.

7. The method of claim 1, further comprising establishing a size for the fixed-sized windows.

8. The method of claim 1, wherein the first window size is established using a predetermined window size value, the hash function is established using a predetermined function, or both.

9. The method of claim 1, wherein the first window size, the hash function, or both, are established by agreement communicated between parties to the string-matching.

10. The method of claim 1, wherein a match for the confidential string-matching is determined by applying fixed-size windowing on a subset of input patterns where the pattern size is outside of the given range, and by applying dynamic-size windowing on a subset of input patterns where the pattern size is within the given range.

11. A system for hybrid windowing for string-matching of input patterns to a corpus, the system comprises at least one processing unit and a non-transitory data storage media in communication with the at least one processing unit, the at least one processing unit configured to execute a first windowing module, or a second windowing module, to:
    establish a first window size of a window and a hash function, wherein the window comprising a string of characters between two indexes in the input patterns, wherein the size of the window is equal to number of characters between the two indexes;
    perform hashing on input patterns having a size within a given range using dynamic-sized windows to determine a dynamic-windowed hash set, wherein the given range comprises the input pattern having a size between a second window size and the first window size, wherein the size of each dynamic-sized window is based on the size of respective input pattern, and wherein the hash function maps each value of the input patterns to a value in the given range;
    perform hashing on the input patterns having a size outside the given range using fixed-sized windows to determine a fixed-windowed hash set;
    combine the dynamic-windowed hash set and the fixed-windowed hash set to determine a combined hash set; and
    output the combined hash set for use in confidential string-matching.

12. The system of claim 11, wherein the first windowing module, or the second windowing module, further establishes a second window size, and wherein the given range comprises patterns having a size between the second window size and the first window size.

13. The system of claim 11, wherein the given range comprises patterns having a size less than the first window size.

14. The system of claim 11, wherein the dynamic-sized windows have a plurality of different sizes for respective pattern sizes.

15. The system of claim 11, wherein the size of each dynamic-sized window is equal to the size of the input pattern.

16. The system of claim 11, wherein the combined hash set comprises the union of the dynamic-windowed hash set and the fixed-windowed hash set.

17. The system of claim 11, wherein the first windowing module, or the second windowing module, further establishes a size for the fixed-sized windows.

18. The system of claim 11, wherein the first window size is established using a predetermined window size value, the hash function is established using a predetermined function, or both.

19. The system of claim 11, wherein the first window size, the hash function, or both, are established by agreement communicated between parties to the string-matching.

20. The system of claim 11, wherein a match for the confidential string-matching is determined by applying fixed-size windowing on a subset of input patterns where the pattern size is outside of the given range, and by applying dynamic-size windowing on a subset of input patterns where the pattern size is within the given range.

* * * * *